(12) United States Patent
Kim

(10) Patent No.: US 9,032,385 B2
(45) Date of Patent: May 12, 2015

(54) MOBILE TERMINAL AND CONTROL METHOD THEREOF

(75) Inventor: Jonghwan Kim, Incheon (KR)

(73) Assignee: LG Electronics Inc., Seoul (KR)

( * ) Notice: Subject to any disclaimer, the term of this patent is extended or adjusted under 35 U.S.C. 154(b) by 133 days.

(21) Appl. No.: 13/523,809

(22) Filed: Jun. 14, 2012

(65) Prior Publication Data

US 2013/0174137 A1 Jul. 4, 2013

(30) Foreign Application Priority Data

Dec. 28, 2011 (KR) .................. 10-2011-0145058
Dec. 28, 2011 (KR) .................. 10-2011-0145077

(51) Int. Cl.
*G06F 9/44* (2006.01)
*G06F 9/445* (2006.01)

(52) U.S. Cl.
CPC ........................................ *G06F 8/65* (2013.01)

(58) Field of Classification Search
CPC .......................................................... G06F 8/65
See application file for complete search history.

(56) References Cited

U.S. PATENT DOCUMENTS

| | | | |
|---|---|---|---|
| 6,711,573 B2 | 3/2004 | Ullmann et al. |
| 7,027,811 B2 | 4/2006 | Pedlar |
| 7,103,344 B2 | 9/2006 | Menard |
| 7,136,858 B2 | 11/2006 | Malik et al. |
| 7,231,354 B1 | 6/2007 | Rooks et al. |
| 7,257,399 B2 | 8/2007 | Pedlar |
| 7,293,169 B1 | 11/2007 | Righi et al. |
| 7,444,349 B1 | 10/2008 | Ochotta |
| 7,447,194 B1 | 11/2008 | Schlesener et al. |
| 7,536,392 B2 | 5/2009 | Malik et al. |
| 7,593,743 B2 | 9/2009 | East |
| 7,644,406 B2 | 1/2010 | Gustafson et al. |
| 7,673,148 B2 | 3/2010 | Zou et al. |
| 7,694,101 B2 | 4/2010 | Lecomte et al. |
| 7,698,176 B2 | 4/2010 | Taylor et al. |
| 7,698,698 B2 | 4/2010 | Skan |
| 7,711,720 B2 | 5/2010 | Suzuki |
| 7,814,010 B2 | 10/2010 | Di Luoffo et al. |
| 7,831,779 B2 | 11/2010 | Holt |
| 7,870,099 B2 | 1/2011 | Omura |
| 7,921,325 B2 | 4/2011 | Kondo et al. |
| 7,930,646 B2 | 4/2011 | De Souza Sana et al. |
| 7,971,005 B2 | 6/2011 | Holt |
| 7,979,516 B2 | 7/2011 | Dacosta |
| 8,001,322 B2 | 8/2011 | Lecomte et al. |
| 8,032,125 B2 | 10/2011 | Wisebourt et al. |
| 8,064,934 B2 | 11/2011 | Klassen |
| 8,065,673 B2 | 11/2011 | D'Souza et al. |
| 8,086,805 B2 | 12/2011 | Holt |
| 8,145,543 B2 | 3/2012 | Cirulli et al. |
| 8,196,131 B1 | 6/2012 | von Behren et al. |
| 8,204,949 B1 | 6/2012 | Krajec |
| 8,245,218 B2 | 8/2012 | Giambalvo et al. |
| 8,255,698 B2 | 8/2012 | Li et al. |

(Continued)

*Primary Examiner* — Philip Wang
(74) *Attorney, Agent, or Firm* — Lee, Hong, Degerman, Kang & Waimey

(57) ABSTRACT

A mobile terminal capable of performing updating on an application and a control method thereof are disclosed. The mobile terminal includes: a checking unit configured to check status information of the mobile terminal in relation to updating of an application; a detection unit configured to detect an application in which an update event has occurred, on the basis of the status information of the mobile terminal; and a controlled configured to perform updating on the application detected by the detection unit.

25 Claims, 29 Drawing Sheets

(56) References Cited

U.S. PATENT DOCUMENTS

| | | |
|---|---|---|
| 8,321,949 B1 | 11/2012 | Green et al. |
| 8,352,591 B2 | 1/2013 | Lee et al. |
| 8,381,205 B2 | 2/2013 | Burke et al. |
| 8,429,236 B2 | 4/2013 | Brown et al. |
| 8,448,072 B1 | 5/2013 | Lai et al. |
| 8,448,187 B2 | 5/2013 | Inami |
| 8,463,883 B2 | 6/2013 | Nicoulin et al. |
| 8,473,599 B2 | 6/2013 | Bertin |
| 8,484,435 B2 | 7/2013 | Gremaud et al. |
| 8,489,332 B2 | 7/2013 | Tomobe et al. |
| 8,490,179 B2 | 7/2013 | Proudler |
| 8,509,754 B2 | 8/2013 | Poplett et al. |
| 8,521,545 B2 | 8/2013 | Thompson et al. |
| 8,533,525 B2 | 9/2013 | Matsugashita |
| 8,589,341 B2 | 11/2013 | Golde et al. |
| 8,601,371 B2 | 12/2013 | Dirks et al. |
| 8,613,101 B2 | 12/2013 | Raje et al. |
| 8,626,716 B1 | 1/2014 | Katzer et al. |
| 8,630,669 B2 | 1/2014 | Kelly |
| 8,635,248 B2 | 1/2014 | Obasanjo et al. |
| 8,656,270 B2 | 2/2014 | Rui et al. |
| 8,694,920 B2 | 4/2014 | Kirtane et al. |
| 8,752,015 B2 | 6/2014 | Basak et al. |
| 8,752,040 B2 | 6/2014 | Halliday |
| 2002/0040300 A1 | 4/2002 | Ell |
| 2003/0009391 A1 | 1/2003 | Nabb et al. |
| 2003/0037244 A1 | 2/2003 | Goodman et al. |
| 2003/0195974 A1 | 10/2003 | Ronning |
| 2003/0212992 A1 | 11/2003 | Ronning et al. |
| 2003/0227902 A1 | 12/2003 | Lindquist |
| 2004/0236680 A1 | 11/2004 | Luoffo et al. |
| 2005/0044143 A1 | 2/2005 | Zimmermann et al. |
| 2005/0083642 A1 | 4/2005 | Senpuku et al. |
| 2006/0190773 A1* | 8/2006 | Rao et al. .................... 714/38 |
| 2006/0293937 A1 | 12/2006 | Sohm et al. |
| 2007/0006219 A1* | 1/2007 | Sinha et al. .................... 717/174 |
| 2007/0028159 A1 | 2/2007 | Ying et al. |
| 2007/0112785 A1 | 5/2007 | Murphy et al. |
| 2007/0136082 A1 | 6/2007 | Jackson et al. |
| 2007/0260730 A1 | 11/2007 | Gadwale |
| 2008/0005119 A1 | 1/2008 | Fernandez et al. |
| 2008/0132268 A1 | 6/2008 | Choi-Grogan et al. |
| 2008/0140973 A1 | 6/2008 | Holt |
| 2008/0140975 A1 | 6/2008 | Holt |
| 2008/0250221 A1 | 10/2008 | Holt |
| 2008/0263162 A1 | 10/2008 | Staiman et al. |
| 2008/0267220 A1 | 10/2008 | Saad et al. |
| 2009/0157626 A1 | 6/2009 | Lee et al. |
| 2009/0210882 A1 | 8/2009 | Srivastava et al. |
| 2009/0235325 A1 | 9/2009 | Dimitrakos et al. |
| 2009/0271507 A1 | 10/2009 | Kodimer |
| 2010/0058425 A1 | 3/2010 | Masimore |
| 2010/0058468 A1 | 3/2010 | Green et al. |
| 2010/0107150 A1 | 4/2010 | Kamada et al. |
| 2010/0114825 A1 | 5/2010 | Siddegowda |
| 2010/0174734 A1 | 7/2010 | Norbauer et al. |
| 2010/0180127 A1 | 7/2010 | Li et al. |
| 2010/0191831 A1 | 7/2010 | Moon et al. |
| 2011/0113350 A1 | 5/2011 | Carlos |
| 2011/0125993 A1 | 5/2011 | Kim et al. |
| 2011/0271175 A1 | 11/2011 | Lavi et al. |
| 2012/0042261 A1 | 2/2012 | Phillips et al. |
| 2012/0066610 A1 | 3/2012 | Phillips et al. |
| 2012/0113797 A1 | 5/2012 | De Pasquale et al. |
| 2012/0130725 A1* | 5/2012 | Cooper et al. .................... 705/1.1 |
| 2012/0142318 A1 | 6/2012 | Okon |
| 2012/0190350 A1* | 7/2012 | Ratnakar .................... 455/414.3 |
| 2012/0311692 A1 | 12/2012 | Ebina et al. |
| 2013/0054363 A1* | 2/2013 | Sasankan et al. .......... 705/14.54 |
| 2013/0104114 A1 | 4/2013 | Reiss et al. |
| 2013/0115940 A1* | 5/2013 | Zhou et al. .................... 455/426.1 |
| 2013/0152181 A1 | 6/2013 | Eiler |
| 2014/0033193 A1 | 1/2014 | Palaniappan |

* cited by examiner

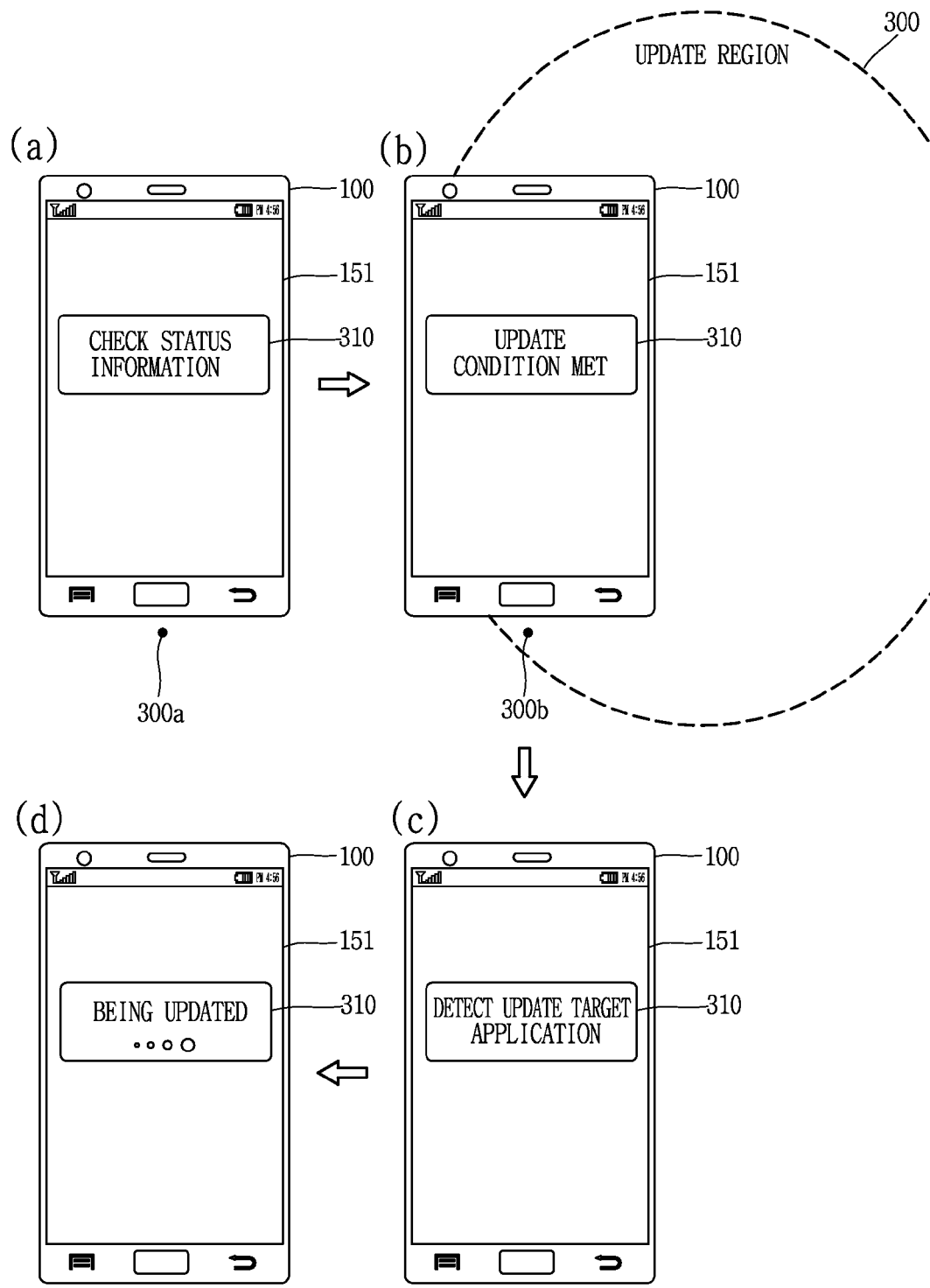

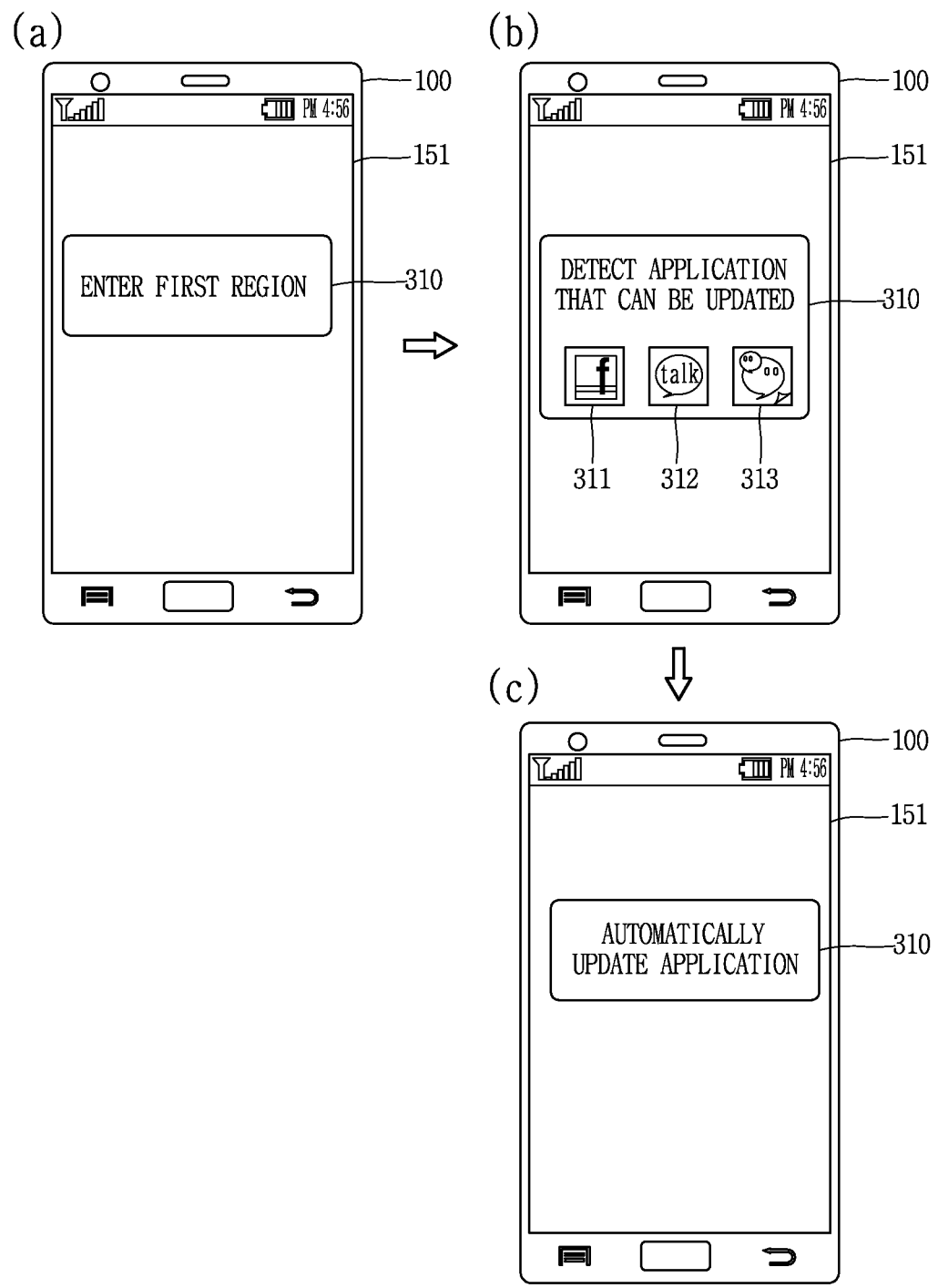

FIG. 9
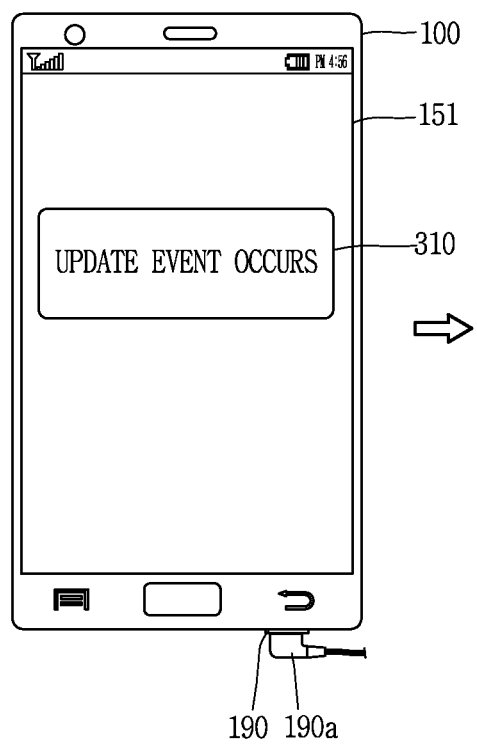
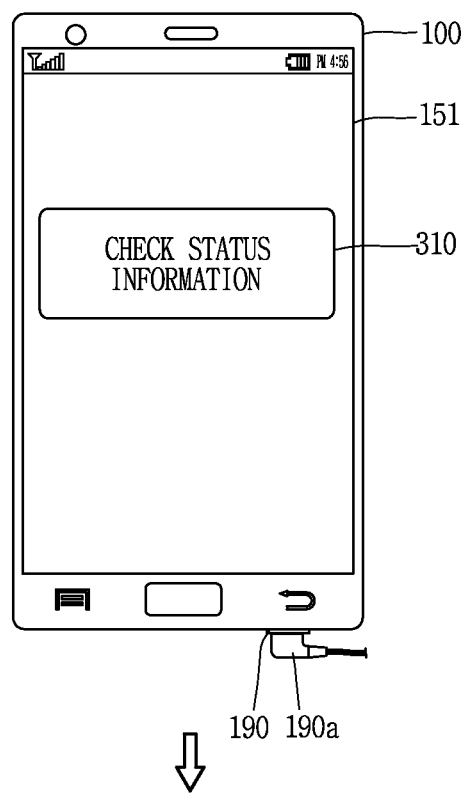
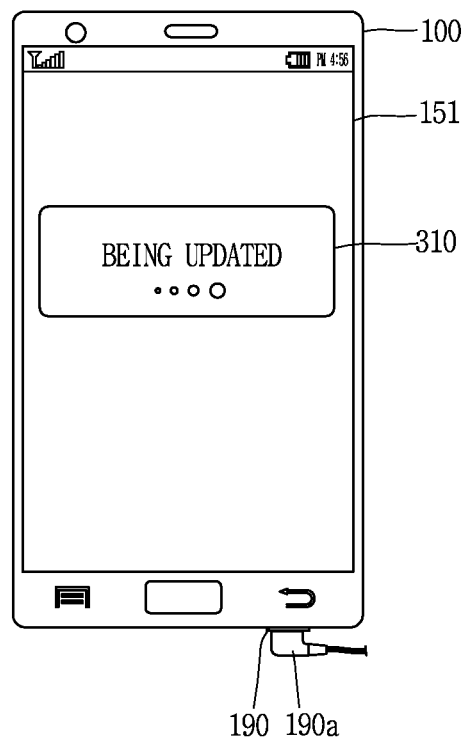

FIG. 10A
(a) 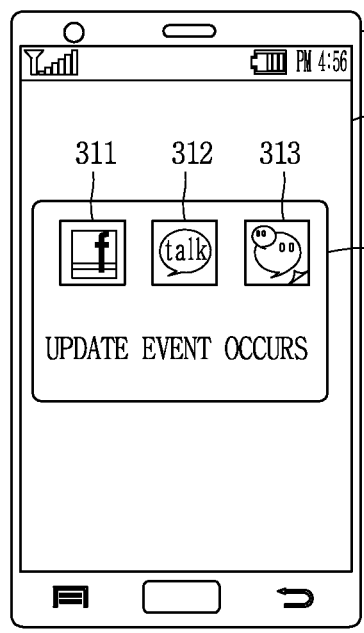
(b) 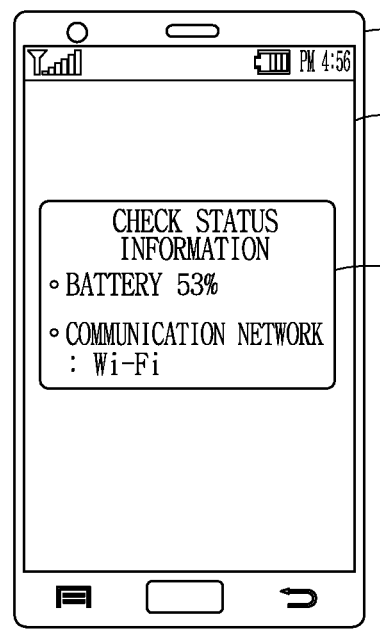
(c) 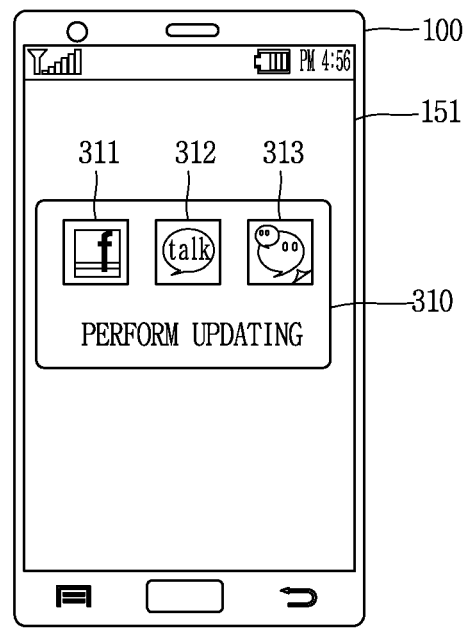

FIG. 10B
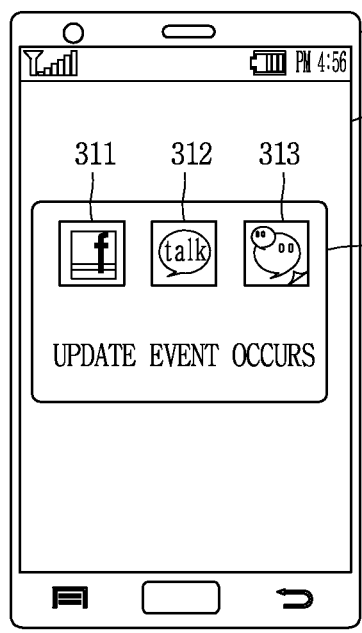
(a)
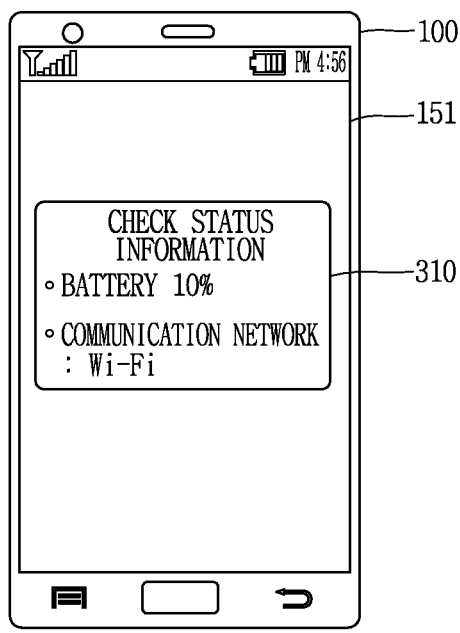
(b)
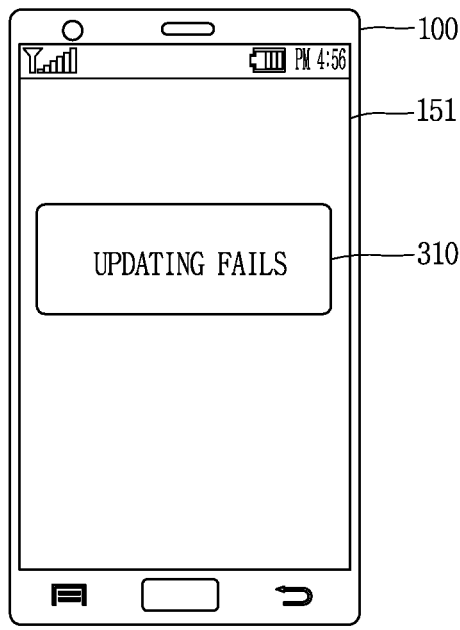
(c)

FIG. 20
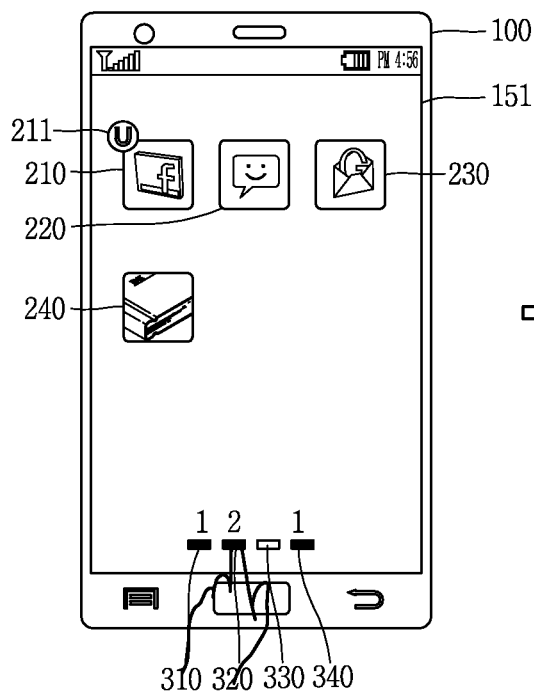
(a)
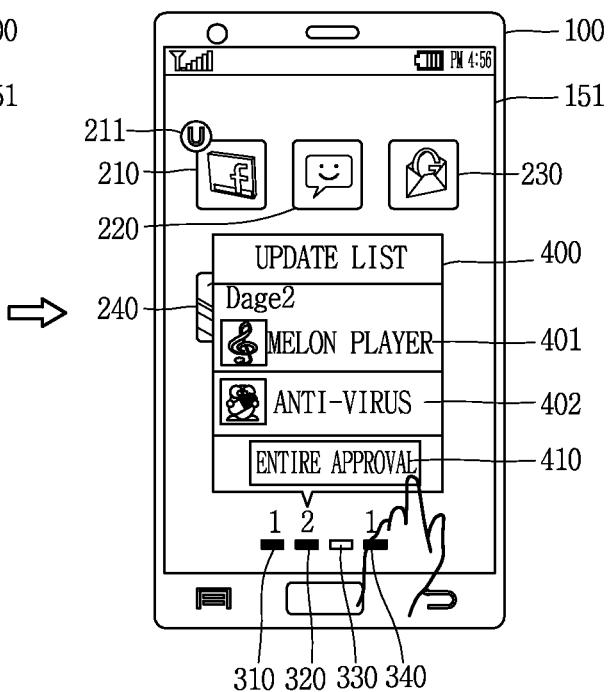
(b)
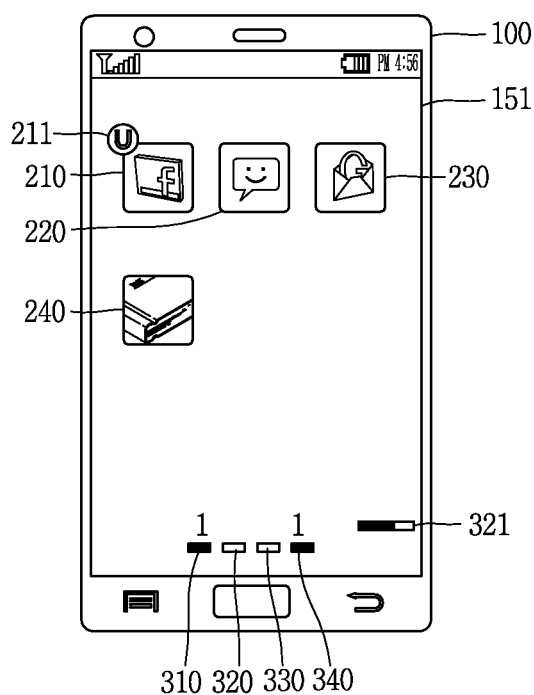
(c)
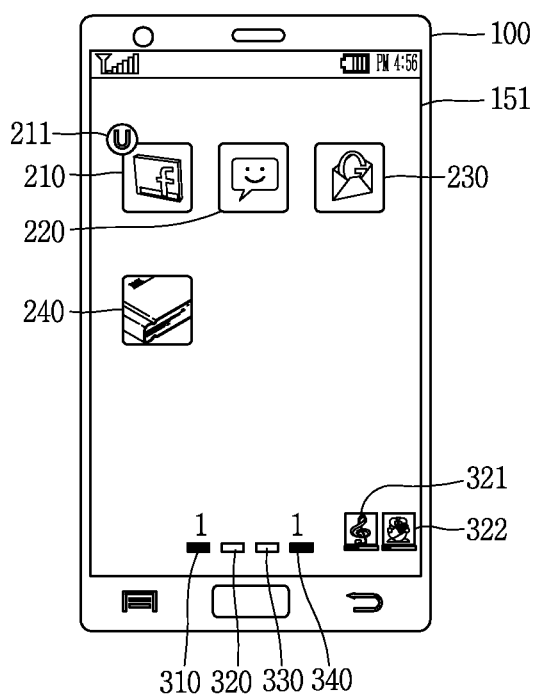
(c)

FIG. 21
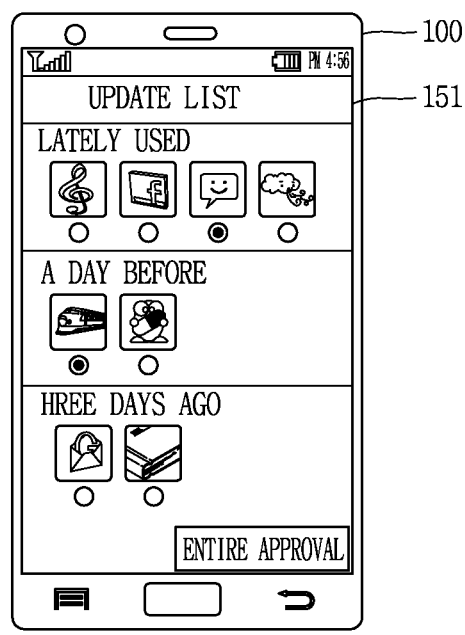
(a)
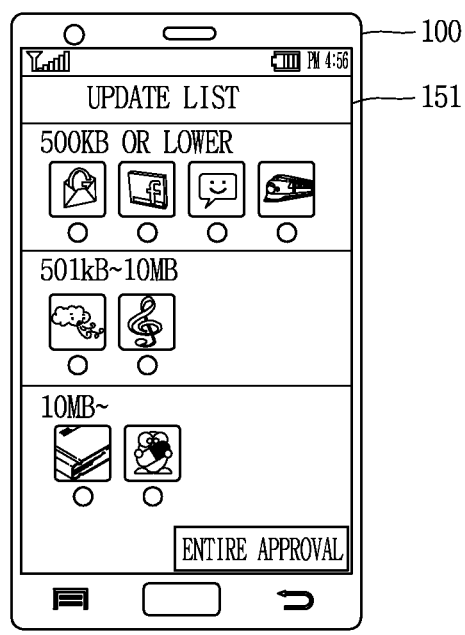
(b)
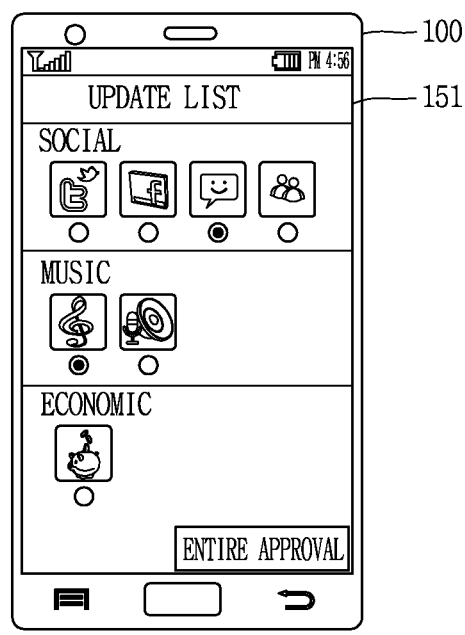
(c)

MOBILE TERMINAL AND CONTROL METHOD THEREOF

CROSS REFERENCE TO RELATED APPLICATIONS

Pursuant to 35 U.S.C 0119(a), this application claims the benefit of earlier filing date and right of priority to Korean Application Nos. 10-2011-0145058, filed on Dec. 28, 2011, and 10-2011-0145077, filed on Dec. 28, 2011, the contents of which are all hereby incorporated by reference herein in their entirety.

BACKGROUND OF THE INVENTION

1. Field of the Invention

The present invention relates to a mobile terminal capable of updating an application, and a control method thereof.

2. Description of the Related Art

In general, terminals may be divided into a mobile terminal and stationary terminal according to whether or not terminals are movable. In addition, mobile terminals may be divided into a handheld terminal and a vehicle mount terminal according to whether or not users can directly carry it around.

A mobile terminal may be configured to perform various functions. Examples of such functions include data and voice communication function, a function of capturing images and video through a camera, a function of storing a voice, playing music files through a speaker system, a function of displaying images or video. Some mobile terminals include additional functions which supports game playing, while other terminals are configured as multimedia players. More recently, mobile terminals have been configured to receive broadcast and multicast signals to allow for viewing of videos and television programs.

Efforts are ongoing to support and increase the functionality of mobile terminals. Such efforts include software and hardware improvements, as well as changes and improvements in the structural components which form the mobile terminal.

Also, an application program (referred to as an 'application', hereinafter) having a particular purpose may be installed in a mobile terminal to execute various function through the mobile terminal. Meanwhile, the application installed in the mobile terminal may be updated by using update data received from an external server or a service provider. In a method for updating an application, in the related art, a user enters a program that performs updating and applies an update command, or the like. Namely, an application is updated passively.

Also, before the user enters such a program, the user cannot know update content with respect to the application, having a problem in which the user cannot use the latest version of application.

SUMMARY OF THE INVENTION

An aspect of the present invention is to provide a mobile terminal and a control method thereof capable of providing update information to a user when an update event of an application occurs.

Another aspect of the present invention is to provide a mobile terminal and a control method thereof capable of automatically performing updating on an application according to a state of the mobile terminal.

Another aspect of the present invention is to provide a mobile terminal and a control method thereof capable of providing a graphical user interface environment allowing a user to recognize update information with respect to an application by intuition.

According to an embodiment of the present invention, there is provided a mobile terminal including: a checking unit configured to check status information of the mobile terminal in relation to updating of an application; a detection unit configured to detect an application in which an update event has occurred, on the basis of the status information of the mobile terminal; and a controlled configured to perform updating on the application detected by the detection unit.

In an embodiment of the present invention, when the status information of the mobile terminal corresponds with a pre-set update condition, the detection unit may detect the application in which an update event has occurred.

In an embodiment of the present invention, when the application in which the update event has occurred is detected by the detection unit, the controller may output update information with respect to the detected application.

In an embodiment of the present invention, the update information may be output through a pop-up window displayed on a display unit, and the controller may automatically perform updating on the detected application or may perform updating on the basis of an update command applied through the pop-up window.

In an embodiment of the present invention, the checking unit may check the status information of the mobile terminal in real time or at pre-set time intervals.

In an embodiment of the present invention, the status information of the mobile terminal may be associated with at least one of time information, location information, battery information, capacity information, information regarding the frequency of use of an application, and communication mode information.

In an embodiment of the present invention, the mobile terminal may further include: a terminal main body; and a location information unit configured to collect location information of the main body, wherein the checking unit may check whether or not the location information of the main body collected by the location information unit indicates that main body has entered a pre-set region.

In an embodiment of the present invention, the checking unit may check a communication mode of a wireless communication unit, and when the communication mode of the wireless communication unit meets an update condition according to the checking results, the controller may control the detection unit to detect the application in which the update event has occurred.

In an embodiment of the present invention, when the communication mode is changed, the controller may compare a first communication rate corresponding to a previous communication mode before the change and a communication rate corresponding to the changed communication mode, and determine whether to perform updating on the detected application on the basis of the comparison results.

According to an embodiment of the present invention, there is also provided a mobile terminal including: a monitoring unit configured to monitor whether or not an update event with respect to an application occurs, a detection unit configured to detect status information of the mobile terminal in response to an occurrence of the update event; and a controlled configured to update the application in which the update event has occurred according to the detected status information of the mobile terminal.

In an embodiment of the present invention, when the status information of the mobile terminal detected by the detection unit meets a reference condition, the controller updates the application in which the update event has occurred.

In an embodiment of the present invention, the controller may determine whether or not the application corresponding to the update event monitored by the monitoring unit is a pre-set application to be updated, and control the detection unit to detect the status information of the mobile terminal according to the determination results.

In an embodiment of the present invention, the application to be updated may be determined on the basis of at least one of the frequency of use, an update capacity, and a user setting.

In an embodiment of the present invention, when the occurrence of the update event is monitored by the monitoring unit, the controller may output information regarding the application corresponding to the generated update event to a display unit.

In an embodiment of the present invention, the controller may determine whether or not the application corresponding to the update event can be updated on the basis of the status information of the mobile terminal, and when the application can be updated according to the determination results, the controller may output the information regarding the application through a pop-up window.

In an embodiment of the present invention, the controller may automatically perform updating on the application, or perform updating on the basis of an update command applied through the pop-up window.

According to an embodiment of the present invention, there is also provided a mobile terminal including: a display unit configured to display a first icon corresponding to an application; a detection unit configured to detect an update event with respect to the application; and a controller configured to control the display unit to display a second icon in response to the detection of the update event, and execute updating on the application on the basis of an update execution command.

In an embodiment of the present invention, the second icon may be displayed on a region adjacent to the first icon, and the update execution command may be generated in response to a touch input applied to the second icon.

In an embodiment of the present invention, when updating is executed on the application, a progress bar indicating the progress of updating with respect to the application may be displayed on the display unit.

In an embodiment of the present invention, the update execution command may be generated on the basis of a touch input corresponding to a pre-set pattern to the region in which the first icon is displayed, and the controller may execute updating on the application corresponding to the first icon on the basis of the generated update execution command.

In an embodiment of the present invention, the mobile terminal may further include: a checking unit configured to check status information of the mobile terminal in relation to updating of an application, and when the status information of the mobile terminal meets an update condition according to the checking results of the checking unit, the update command may be generated.

According to an embodiment of the present invention, there is also provided a mobile terminal including: a display unit configured to output any one of a plurality of pages on which icons corresponding to applications are displayed; a monitoring unit configured to monitor whether or not an update event has occurred in at least any one of the applications corresponding to the icons displayed on the plurality of pages; and a controller configured to control the display unit to display update information in relation to the update event.

In an embodiment of the present invention, a plurality of page images corresponding to the plurality of pages, respectively, may be displayed in one region of a page output to the display unit, and the controller may display information regarding the update event in a region adjacent to the page image corresponding to the page including the icon of the application in which the update event has occurred among the plurality of page images.

In an embodiment of the present invention, the information regarding the update event may be information regarding the number of applications in which the update event has occurred among the applications corresponding to the icons of the applications included in the pages.

In an embodiment of the present invention, when the page image is selected, a thumbnail of the application in which the update event has occurred among the applications displayed on the page corresponding to the selected page image may be displayed.

In an embodiment of the present invention, when the thumbnail is selected, updating of the application corresponding to the thumbnail may be performed.

In an embodiment of the present invention, when any one of the plurality of page images is selected by the user, the controller may update the application in which the update event has occurred among the applications corresponding to the selected page.

In an embodiment of the present invention, the controller may display a progress bar indicating the progress of updating of the application in a region of the display unit.

In an embodiment of the present invention, the controller may change an output range of the display unit such that the selected page is output.

In an embodiment of the present invention, the mobile terminal may further include: a checking unit configured to check status information of the mobile terminal in relation to updating of an application, wherein when the status information of the mobile terminal meets an update condition according to the checking results of the checking unit, the controller may update an application corresponding to the update event monitored by the monitoring unit.

In an embodiment of the present invention, when the status information of the mobile terminal meets the update condition, the controller may generate a pop-up window and display an application list corresponding to the update event monitored by the monitoring unit in the pop-up window.

In an embodiment of the present invention, the controller may perform updating only on an application selected through the pop-up window or perform updating on the selected application preferentially over the other applications.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings, which are given by illustration only, and thus are not limitative of the present invention, and wherein:

FIG. 5 is a conceptual view explaining an update method of the mobile terminal according to an embodiment disclosed in the present disclosure.

FIG. 7 is a conceptual view explaining a method of providing information regarding an application in relation to updating in the mobile terminal according to an embodiment disclosed in the present disclosure.

FIG. 9 is a conceptual view explaining an update method of the mobile terminal according to another embodiment disclosed in the present disclosure.

FIGS. 10A and 10B are conceptual views explaining a method of performing updating based on status information in the mobile terminal according to another embodiment disclosed in the present disclosure.

FIGS. 19, 20, 21, 22A and 22B are conceptual views explaining a control method of displaying update information in the mobile terminal according to another embodiment disclosed in the present disclosure.

DETAILED DESCRIPTION OF THE INVENTION

The mobile terminal according to exemplary embodiments of the present invention will now be described with reference to the accompanying drawings. In the following description, usage of suffixes such as 'module', 'part' or 'unit' used for referring to elements is given merely to facilitate explanation of the present invention, without having any significant meaning by itself. Accordingly, the 'module' and 'part' may be mixedly used. In describing the present invention, if a detailed explanation for a related known function or construction is considered to unnecessarily divert the gist of the present invention, such explanation has been omitted but would be understood by those skilled in the art. It will be appreciated that the accompanying drawings are presented to help understand the present invention more clearly and the technical concept of the present invention is not limited by the accompanying drawings.

Mobile terminals described in the present disclosure may include mobile phones, smart phones, notebook computers, tablet computers, digital broadcast receivers, PDAs (Personal Digital Assistants), PMPs (Portable Multimedia Player), navigation devices, and the like. However, it would be understood by a person skilled in the art that the configuration according to embodiments of the present invention can be also applicable to the fixed types of terminals such as digital TVs, desk top computers, and the like, except for any elements especially configured for a mobile purpose.

Figure 1:
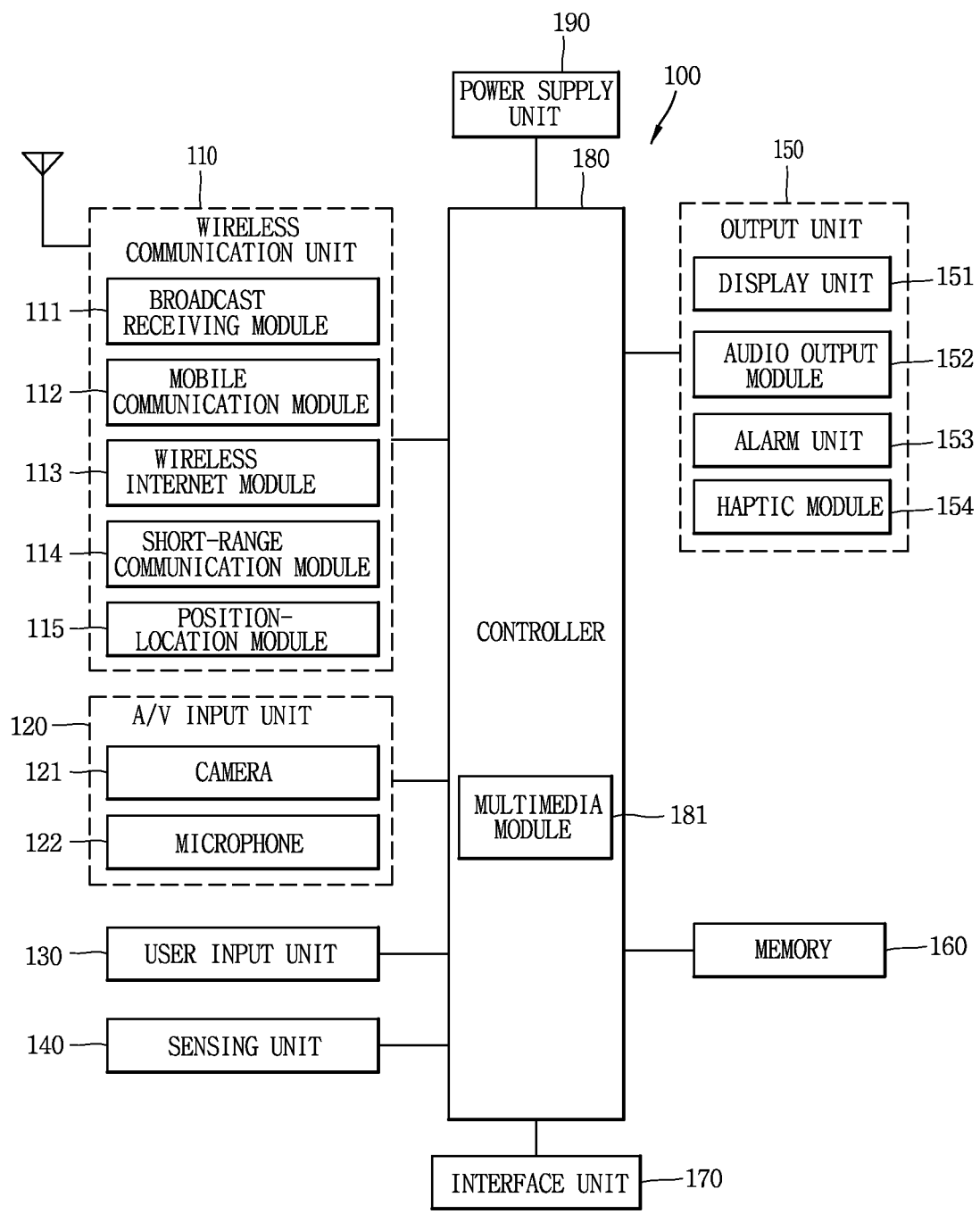
FIG. 1 is a block diagram of a mobile terminal according to an embodiment of the present invention.
Figure 2A:
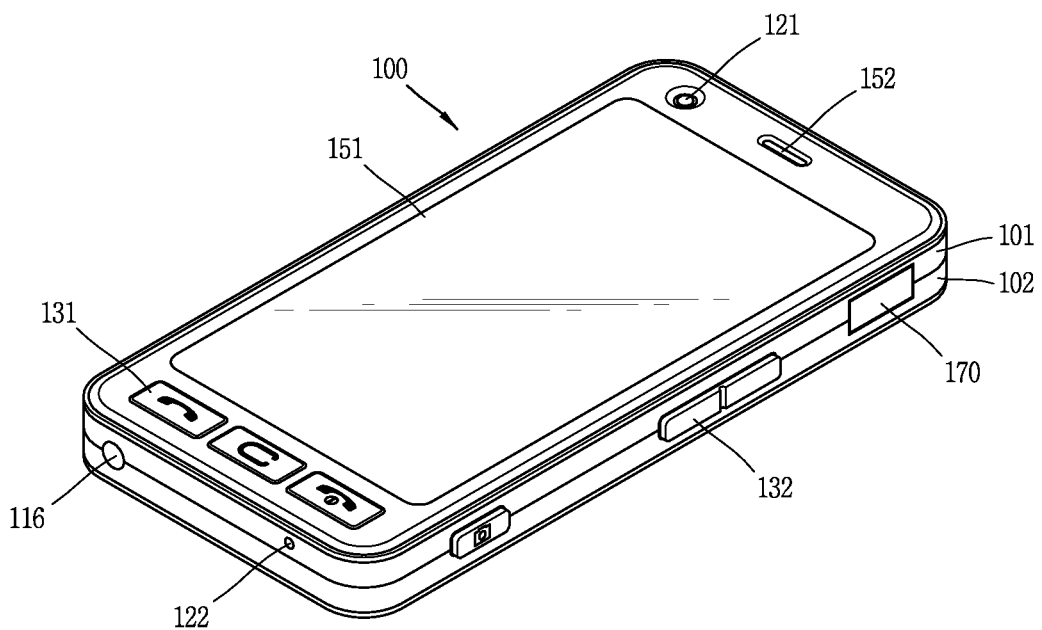
FIGS. 2A and 2B are front perspective views of the mobile terminal according to an embodiment of the present invention.
Figure 2B:
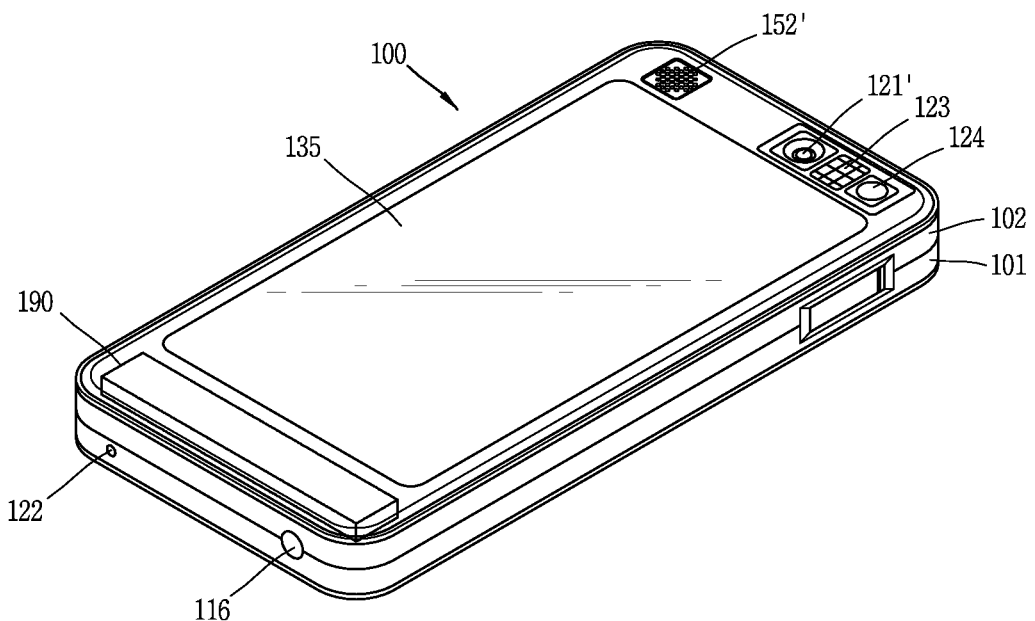

FIG. 1 is a block diagram of a mobile terminal according to an embodiment of the present invention.

The mobile terminal 100 may include a wireless communication unit 110, an A/V (Audio/Video) input unit 120, a user input unit 130, a sensing unit 140, an output unit 150, a memory 160, an interface unit 170, a controller 180, and a power supply unit 190, etc. FIG. 1 shows the mobile terminal as having various components, but it should be understood that implementing all of the illustrated components is not a requirement. Greater or fewer components may alternatively be implemented.

The elements of the mobile terminal will be described in detail as follows.

The wireless communication unit 110 typically includes one or more modules allowing radio communication between the mobile terminal 100 and a wireless communication system or a network in which the mobile terminal is located. For example, the wireless communication unit may include at least one of a broadcast receiving module 111, a mobile communication module 112, a wireless Internet module 113, a short-range communication module 114, and a location information module 115.

The broadcast receiving module 111 receives broadcast signals and/or broadcast associated information from an external broadcast management server (or other network entity) via a broadcast channel.

The broadcast channel may include a satellite channel and/or a terrestrial channel. The broadcast management server may be a server that generates and transmits a broadcast signal and/or broadcast associated information or a server that receives a previously generated broadcast signal and/or broadcast associated information and transmits the same to a terminal. The broadcast signal may include a TV broadcast signal, a radio broadcast signal, a data broadcast signal, and the like. Also, the broadcast signal may further include a broadcast signal combined with a TV or radio broadcast signal.

The broadcast associated information may refer to information associated with a broadcast channel, a broadcast program or a broadcast service provider. The broadcast associated information may also be provided via a mobile communication network and, in this case, the broadcast associated information may be received by the mobile communication module 112.

The broadcast associated information may exist in various forms. For example, it may exist in the form of an electronic program guide (EPG) of digital multimedia broadcasting (DMB), electronic service guide (ESG) of digital video broadcast-handheld (DVB-H), and the like.

The broadcast receiving module 111 may be configured to receive signals broadcast by using various types of broadcast systems. In particular, the broadcast receiving module 111 may receive a digital broadcast by using a digital broadcast system such as multimedia broadcasting-terrestrial (DMB-T), digital multimedia broadcasting-satellite (DMB-S), digital video broadcast-handheld (DVB-H), the data broadcasting system known as media forward link only (MediaFLO®), integrated services digital broadcast-terrestrial (ISDB-T), etc. The broadcast receiving module 111 may be configured to be suitable for every broadcast system that provides a broadcast signal as well as the above-mentioned digital broadcast systems.

Broadcast signals and/or broadcast-associated information received via the broadcast receiving module 111 may be stored in the memory 160.

The mobile communication module 112 transmits and/or receives radio signals to and/or from at least one of a base station (e.g., access point, Node B, etc.), an external terminal (e.g., other user devices) and a server (or other network entities). Such radio signals may include a voice call signal, a video call signal or various types of data according to text and/or multimedia message transmission and/or reception.

The wireless Internet module 113 supports wireless Internet access for the mobile terminal. This module may be internally or externally coupled to the mobile terminal. The wireless Internet access technique implemented may include a WLAN (Wireless LAN) (Wi-Fi), Wibro (Wireless broadband), Wimax (World Interoperability for Microwave Access), HSDPA (High Speed Downlink Packet Access), or the like.

The short-range communication module 114 is a module for supporting short range communications. Some examples of short-range communication technology include Bluetooth™, Radio Frequency IDentification (RFID), Infrared Data Association (IrDA), Ultra-WideBand (UWB), ZigBee™, and the like.

The location information module 115 is a module for checking or acquiring a location (or position) of the mobile terminal. A typical example of the location information module is a GPS (Global Positioning System).

With reference to FIG. 1, the A/V input unit 120 is configured to receive an audio or video signal. The A/V input unit 120 may include a camera 121 and a microphone 122. The camera 121 processes image data of still pictures or video obtained by an image capture device in a video capturing mode or an image capturing mode. The processed image frames may be displayed on a display unit 151.

The image frames processed by the camera 121 may be stored in the memory 160 (or other storage medium) or transmitted via the wireless communication unit 110. Two or more cameras 121 may be provided according to the configuration of the mobile terminal.

The microphone 122 may receive sounds (audible data) via a microphone in a phone call mode, a recording mode, a voice recognition mode, and the like, and can process such sounds into audio data. The processed audio (voice) data may be converted for output into a format transmittable to a mobile communication base station via the mobile communication module 112 in case of the phone call mode. The microphone 122 may implement various types of noise canceling (or suppression) algorithms to cancel (or suppress) noise or interference generated in the course of receiving and transmitting audio signals.

The user input unit 130 may generate input data from commands entered by a user to control various operations of the mobile terminal. The user input unit 130 may include a keypad, a dome switch, a touch pad, a jog wheel, a jog switch, and the like.

The sensing unit (or a detection unit) 140 detects a current status (or state) of the mobile terminal 100 such as an opened or closed state of the mobile terminal 100, a location of the mobile terminal 100, the presence or absence of user contact with the mobile terminal 100 (i.e., touch inputs), the orientation of the mobile terminal 100, an acceleration or deceleration movement and direction of the mobile terminal 100, etc., and generates commands or signals for controlling the operation of the mobile terminal 100. For example, when the mobile terminal 100 is implemented as a slide type mobile phone, the sensing unit 140 may sense whether the slide phone is opened or closed. In addition, the sensing unit 140 can detect whether or not the power supply unit 190 supplies power or whether or not the interface unit 170 is coupled with an external device. The sensing unit 140 may include a proximity sensor 141.

The output unit 150 is configured to provide outputs in a visual, audible, and/or tactile manner (e.g., audio signal, video signal, alarm signal, vibration signal, etc.). The output unit 150 may include the display unit 151, an audio output module 152, an alarm unit 153, a haptic module 154, and the like.

The display unit 151 may display (output) information processed in the mobile terminal 100. For example, when the mobile terminal 100 is in a phone call mode, the display unit 151 may display a User Interface (UI) or a Graphic User Interface (GUI) associated with a call or other communication (such as text messaging, multimedia file downloading, etc.). When the mobile terminal 100 is in a video call mode or image capturing mode, the display unit 151 may display a captured image and/or received image, a UI or GUI that shows videos or images and functions related thereto, and the like.

The display unit 151 may include at least one of a Liquid Crystal Display (LCD), a Thin Film Transistor-LCD (TFT-LCD), an Organic Light Emitting Diode (OLED) display, a flexible display, a three-dimensional (3D) display, or the like.

Some of them may be configured to be transparent or light-transmissive to allow viewing of the exterior, which may be called transparent displays. A typical transparent display may be, for example, a TOLED (Transparent Organic Light Emitting Diode) display, or the like. Through such configuration, the user can view an object positioned at the rear side of the mobile terminal body through the region occupied by the display unit 151 of the mobile terminal body.

The mobile terminal 100 may include two or more display units (or other display means) according to its particular desired embodiment. For example, a plurality of display units may be separately or integrally disposed on one surface of the mobile terminal, or may be separately disposed on mutually different surfaces.

Meanwhile, when the display unit 151 and a sensor (referred to as a 'touch sensor', hereinafter) for detecting a touch operation are overlaid in a layered manner to form a touch screen, the display unit 151 may function as both an input device and an output device. The touch sensor may have a form of a touch film, a touch sheet, a touch pad, and the like.

The touch sensor may be configured to convert pressure applied to a particular portion of the display unit 151 or a change in the capacitance or the like generated at a particular portion of the display unit 151 into an electrical input signal. The touch sensor may be configured to detect the pressure when a touch is applied, as well as the touched position and area.

When there is a touch input with respect to the touch sensor, a corresponding signal (signals) are transmitted to a touch controller. The touch controller processes the signals and transmits corresponding data to the controller 180. Accordingly, the controller 180 may recognize which portion of the display unit 151 has been touched.

With reference to FIG. 1, a proximity sensor 141 may be disposed within or near the touch screen. The proximity sensor 141 is a sensor for detecting the presence or absence of an object relative to a certain detection surface or an object that exists nearby by using the force of electromagnetism or infrared rays without a physical contact. Thus, the proximity sensor 141 has a considerably longer life span compared with a contact type sensor, and it can be utilized for various purposes.

Examples of the proximity sensor 141 may include a transmission type photoelectric sensor, a direct reflection type photoelectric sensor, a mirror-reflection type photoelectric sensor, an RF oscillation type proximity sensor, a capacitance type proximity sensor, a magnetic proximity sensor, an infrared proximity sensor, and the like. In case where the touch screen is the capacitance type, proximity of the pointer is detected by a change in electric field according to the proximity of the pointer. In this case, the touch screen (touch sensor) may be classified as a proximity sensor.

In the following description, for the sake of brevity, recognition of the pointer positioned to be close to the touch screen will be called a 'proximity touch', while recognition of actual contacting of the pointer on the touch screen will be called a 'contact touch'. In this case, when the pointer is in the state of the proximity touch, it means that the pointer is positioned to correspond vertically to the touch screen.

By employing the proximity sensor 141, a proximity touch and a proximity touch pattern (e.g., a proximity touch distance, a proximity touch speed, a proximity touch time, a proximity touch position, a proximity touch movement state, or the like) can be detected, and information corresponding to the detected proximity touch operation and the proximity touch pattern can be outputted to the touch screen.

The audio output module 152 may convert and output as sound audio data received from the wireless communication unit 110 or stored in the memory 160 in a call signal reception mode, a call mode, a record mode, a voice recognition mode, a broadcast reception mode, and the like. Also, the audio output module 152 may provide audible outputs related to a particular function performed by the mobile terminal 100 (e.g., a call signal reception sound, a message reception sound, etc.). The audio output module 152 may include a speaker, a buzzer, or other sound generating device.

The alarm unit 153 may provide outputs to inform about the occurrence of an event of the mobile terminal 100. Typical events may include call reception, message reception, key signal inputs, a touch input etc. In addition to audio or video outputs, the alarm unit 153 may provide outputs in a different manner to inform about the occurrence of an event. For example, the alarm unit 153 may provide an output in the form of vibrations (or other tactile or sensible outputs). When a call, a message, or some other incoming communication is received, the alarm unit 153 may provide tactile outputs (i.e., vibrations) to inform the user thereof. By providing such tactile outputs, the user can recognize the occurrence of various events even if his mobile phone is in the user's pocket.

Outputs informing about the occurrence of an event may be also provided via the display unit 151 or the audio output module 152. The display unit 151 and the audio output module 152 may be classified as a part of the alarm unit 153.

The haptic module 154 generates various tactile effects the user may feel. A typical example of the tactile effects generated by the haptic module 154 is vibration. The strength and pattern of the haptic module 154 can be controlled. For example, different vibrations may be combined to be outputted or sequentially outputted.

Besides vibration, the haptic module 154 may generate various other tactile effects such as an effect by stimulation such as a pin arrangement vertically moving with respect to a contact skin, a spray force or suction force of air through a jet orifice or a suction opening, a contact on the skin, a contact of an electrode, electrostatic force, etc., an effect by reproducing the sense of cold and warmth using an element that can absorb or generate heat.

The haptic module 154 may be implemented to allow the user to feel a tactile effect through a muscle sensation such as fingers or arm of the user, as well as transferring the tactile effect through a direct contact. Two or more haptic modules 154 may be provided according to the configuration of the mobile terminal 100.

The memory 160 may store software programs used for the processing and controlling operations performed by the controller 180, or may temporarily store data (e.g., a phonebook, messages, still images, video, etc.) that are inputted or outputted. In addition, the memory 160 may store data regarding various patterns of vibrations and audio signals outputted when a touch is inputted to the touch screen.

The memory 160 may include at least one type of storage medium including a Flash memory, a hard disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, and an optical disk. Also, the mobile terminal 100 may be operated in relation to a web storage device that performs the storage function of the memory 160 over the Internet.

The interface unit 170 serves as an interface with every external device connected with the mobile terminal 100. For example, the external devices may transmit data to an external device, receives and transmits power to each element of the mobile terminal 100, or transmits internal data of the mobile terminal 100 to an external device. For example, the interface unit 170 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating the authority of using the mobile terminal 100 and may include a user identity module (UIM), a subscriber identity module (SIM) a universal subscriber identity module (USIM), and the like. In addition, the device having the identification module (referred to as 'identifying device', hereinafter) may take the form of a smart card. Accordingly, the identifying device may be connected with the mobile terminal 100 via a port.

When the mobile terminal 100 is connected with an external cradle, the interface unit 170 may serve as a passage to allow power from the cradle to be supplied therethrough to the mobile terminal 100 or may serve as a passage to allow various command signals inputted by the user from the cradle to be transferred to the mobile terminal therethrough. Various command signals or power inputted from the cradle may operate as signals for recognizing that the mobile terminal is properly mounted on the cradle.

The controller 180 typically controls the general operations of the mobile terminal. For example, the controller 180 performs controlling and processing associated with voice calls, data communications, video calls, and the like. The controller 180 may include a multimedia module 181 for reproducing multimedia data. The multimedia module 181 may be configured within the controller 180 or may be configured to be separated from the controller 180.

The controller 180 may perform a pattern recognition processing to recognize a handwriting input or a picture drawing input performed on the touch screen as characters or images, respectively.

The power supply unit 190 receives external power or internal power and supplies appropriate power required for operating respective elements and components under the control of the controller 180.

Various embodiments described herein may be implemented in a computer-readable or its similar medium using, for example, software, hardware, or any combination thereof.

For hardware implementation, the embodiments described herein may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic units designed to perform the functions described herein. In some cases, such embodiments may be implemented by the controller 180 itself.

For software implementation, the embodiments such as procedures or functions described herein may be implemented by separate software modules. Each software module may perform one or more functions or operations described herein. Software codes can be implemented by a software application written in any suitable programming language. The software codes may be stored in the memory 160 and executed by the controller 180.

Also, the mobile terminal may include at least one or more of the elements as described above and may execute updating on an application installed in the mobile terminal main body.

Here, the 'application' may be expressed as an 'application program' which is a dedicated program for performing a particular work or operation. For example, the application may be a program in relation to games, music, a document operation, a message, financing, e-book, traffic information, and the like.

Meanwhile, updating of an application refers to changing relevant existing data into the latest data when there is a matter to be added to or to be changed in an execution file, a library, or resource of the application. The latest data may be received from an external server in relation to the corresponding application.

A method of performing updating on an application by using the mobile terminal according to an embodiment of the present invention will be described with reference to the accompanying drawings.

Figure 3:
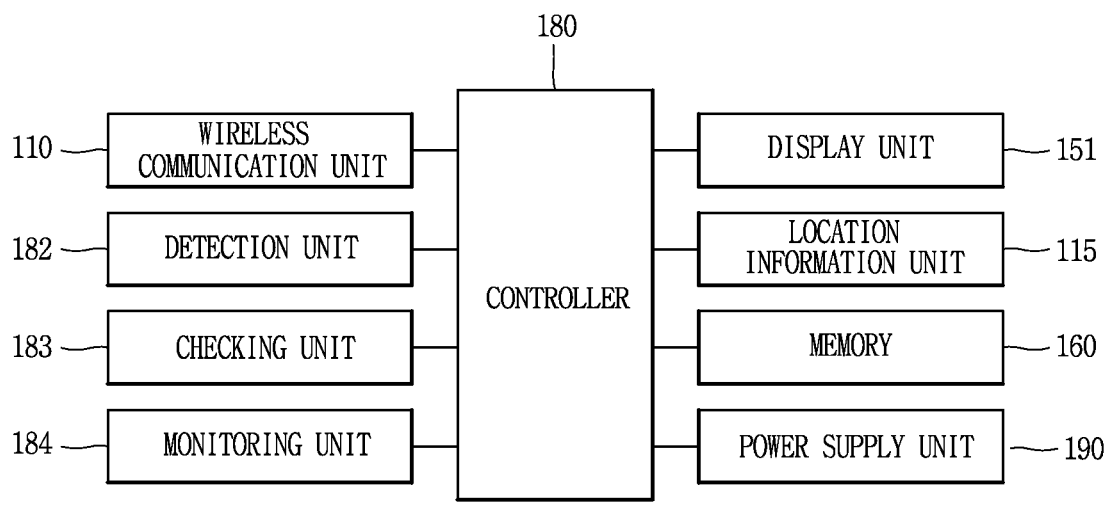
FIG. 3 is a block diagram schematically showing the mobile terminal according to an embodiment disclosed in the present disclosure.

FIG. 3 is a block diagram schematically showing the mobile terminal 100 according to an embodiment disclosed in the present disclosure. Here, content already described above with reference to FIG. 1 will be omitted.

With reference to FIG. 3, the mobile terminal may include the controller 180, a detection unit 182, a checking unit 183, a monitoring unit 184, the wireless communication unit 110, the display unit 151, the location information unit 115, the memory 160, and the power supply unit 190.

The mobile terminal according to an embodiment of the present invention may perform updating on an application installed in the mobile terminal according to status information of the mobile terminal.

In an embodiment, first, the checking unit 183 checks status information of the mobile terminal in relation to updating of the application.

Here, the 'status information' is related to an update condition allowing for updating of the application and may be variably set by the controller 180 or according to a user setting.

For example, the 'status information' may be related to at least one of whether or not power is supplied (or whether or not a dock is detected), a location of the mobile terminal, a communication mode (3G, 4G, Wi-Fi, NFC, or the like) of the mobile terminal, time information, battery information, an update capacity, billing information, whether or not the mobile terminal is connected to a cloud server, the frequency of use of the application.

For example, in case in which the user sets performing of updating on an application as 'status information' when a 'location of terminal' is 'home' of the user, the checking unit 183 checks a location of the mobile terminal.

Here, the checking unit 183 may continuously check the status information of the mobile terminal in real time or at pre-set intervals.

Next, the detection unit 182 detects an application in which an update event has occurred among a plurality of applications installed in the mobile terminal on the basis of the status information of the mobile terminal checked by the checking unit 183.

Namely, when the status information of the mobile terminal corresponds to (or meets) a pre-set update condition, the detection unit 182 may detect an application in which an update event has occurred.

For example, when the user sets an update condition such that updating is executed on the application when power is supplied to the mobile terminal, the checking unit 183 checks whether or not power is supplied to the power supply unit 190.

Upon checking, when power supply to the power supply unit 190 is detected, the detection unit 182 may detect the application in which the update event has occurred.

Here, as described above, when there is a matter to be added to or to be changed in an execution file, a library, or resource of the application, the update event may occur on the basis of data in relation to updating received from an external server.

Meanwhile, as described above, when the application in which the update event has occurred is detected by the detection unit 180, the controller 180 performs updating on the detected application.

Also, when an application that can be updated is detected by the detection unit 182, the controller 180 may output corresponding notification information.

The controller 180 may output the notification information to the user, so that the user can select whether to perform updating on the application. Also, although the user does not select whether to perform updating on the application, when the update condition with respect to the application is met, the controller 180 may automatically perform updating on the application.

Meanwhile, the notification information may be output by using at least one of a sound, vibration, a lamp, a pop-up window, and the user may select whether to perform updating on the application through the pop-up window.

In the method as described above, the status information of the mobile terminal is first checked, and when the checked status information of the mobile terminal meets the update condition, namely, when the status information of the mobile terminal is first checked, and when the checked status information of the mobile terminal corresponds to the update condition, an application in which an update event has occurred is detected and updating is performed on the application.

Hereinafter, a method of checking status information of the mobile terminal on the basis of an update event occurring with respect to an application and updating the application according to the check results will be described.

First, the monitoring unit 184 monitors whether or not an update event has occurred in an application installed in the mobile terminal.

When an update event has occurred in an application according to the monitoring results of the monitoring unit 184, the checking unit 183 detects status information of the mobile terminal in response to the generated update event.

Here, as described above, the status information of the mobile terminal is information regarding whether or not the mobile terminal is in a state in which the application can be updated, and such status information of the mobile terminal may be set according to a user selection.

In this manner, when the status information of the mobile terminal meets the update condition (or reference condition), the controller 180 may perform updating on the application in which the update event has occurred.

Meanwhile, the controller 180 may control whether to perform updating according to a type of an application among applications monitored by the monitoring unit 184.

For example, the user may select an 'application to be updated (or an update target application)', and the controller 180 determines whether or not the monitored application is an 'update target application'. According to the determination results, when the application in which the update event has occurred is an update target application, the controller 180 may control the checking unit 183 to check the status information of the mobile terminal.

Meanwhile, the update target application may be determined by the frequency of use of an application, an update capacity, and at least one of the applications selected by the user.

Also, according to the check results of the checking unit 183, when the status information of the mobile terminal does not meet the update condition for updating the application, the controller 180 may not update the application in which the update event has occurred.

In this case, the controller 180 may store the information regarding the application in which the update event has occurred in the memory 160, and thereafter, when the status information of the mobile terminal meets the update condition, the controller 180 may perform updating on the application.

Meanwhile, when the monitoring unit 184 monitors that the update event has occurred with respect to the application, the controller 180 may output information regarding the application in which the update event has occurred to the display unit 151 to inform the user accordingly.

Namely, on the basis of status information of the mobile terminal checked by the checking unit 183, the controller 180 determines whether or not the application corresponding to the update event can be updated, and when updating of the application can be performed according to the determination results, the controller 180 may output corresponding information through a pop-up window, or the like.

In this case, the controller 180 may perform updating on the application on the basis of an update command applied from the user through the pop-up window, or automatically perform updating on the application.

As described above, in the mobile terminal according to an embodiment disclosed in the present disclosure, when the mobile terminal is in a state in which updating can be performed on the application, updating can be performed on the application automatically or on the basis of a user selection. Thus, user inconvenience of accessing an application in relation to an updating function to perform updating on the application additionally can be reduced.

Hereinafter, a method of performing updating on an application according to status information of the mobile terminal will be described in detail with reference to FIGS. 4 and 5.

Figure 4:
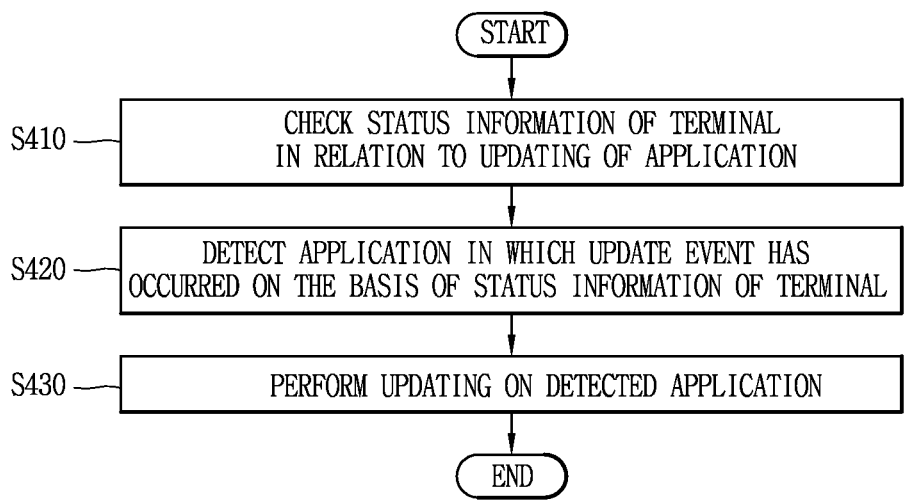
FIG. 4 is a flow chart illustrating a control method of the mobile terminal according to an embodiment disclosed in the present disclosure.

FIG. 4 is a flow chart illustrating a control method of the mobile terminal according to an embodiment disclosed in the present disclosure, and FIG. 5 is a conceptual view explaining an update method of the mobile terminal according to an embodiment disclosed in the present disclosure.

First, the checking unit 183 in FIG. 3 checks status information of the mobile terminal in relation to updating of an application in real time or at pre-set time intervals (step S410).

For example, when the status information of the mobile terminal is information related to a location of the mobile terminal, the checking unit 183 checks location information of the mobile terminal collected by the location information unit 115.

The location information unit 115 may receive location information of the main body by using a global positioning system (GPS) or a Wi-Fi positioning system (WPS) among the location positioning techniques.

Here, the GPS refers to a system receiving location information of the main body from artificial satellites rotating about the earth. Namely, the location information unit 115 may obtain location information of the main body through latitude information and longitude information received from the GPS.

Meanwhile, the WPS refers to a system determining a location of the main body by using virtual access point (AP) database (DP) information established through War-Driving and WLAN AP information from the mobile terminal 100. Namely, the location information unit 115 may obtain location information of the main body through triangulation on the basis of a location of an AP of Wi-Fi.

For example, as shown in FIG. 5(*a*), the location information unit 115 collects location of the mobile terminal at a first spot 300*a*, and similarly, as shown in FIG. 5(*b*), when the mobile terminal 100 moves from the first spot 300*a* to a second spot 300*b*, the location information unit 115 collects location information of the mobile terminal 100 at the second spot 300*b*.

The checking unit 183 checks location information of the mobile terminal collected by the location information unit 115. The checking unit 183 checks whether or not the location of the mobile terminal 100 is in an update region in which the status information of the mobile terminal meets the update condition.

For example, as shown in FIG. 5(*b*), when the region corresponding to the second spot 300*b* is an update region 300, the status information of the mobile terminal may be considered to meet the update condition.

Meanwhile, when the status information of the mobile terminal meets the update condition, as shown in FIG. 5(*b*), the controller 180 may output information regarding the status of the mobile terminal through a pop-up window 310.

Next, when the status information of the mobile terminal meets the update condition, the detection unit 182 detects an application in which an update event has occurred (step S420).

And, the controller 180 performs updating on the detected application (step S430).

Here, as shown in FIG. 5(*c*) and (*d*), the controller 180 may automatically execute updating on the application in which the update event has occurred. Also, although not shown, the controller 180 may output a pop-up window and perform updating on the application according to a user selection through the output pop-up window.

Also, the controller 180 may perform updating on every application in which the update event has occurred, and selectively perform updating only on an application corresponding to a pre-set reference. Here, the application corresponding to the pre-set reference may be an application selected by the user or an application corresponding to a reference set by the user.

In the above, the method of updating an application when status information of the mobile terminal meets the update condition has been described.

Hereinafter, specific embodiments in relation to status information of the mobile terminal will be described with reference to FIGS. 6A, 6B, 6C, 6D, and 6E. FIGS. 6A, 6B, 6C, 6D, and 6E are conceptual views explaining status information of the mobile terminal.

In the method as described above, the mobile terminal according to an embodiment of the present invention updates an application when the status information of the mobile terminal meets the update condition set by the user or the controller.

Here, a status of the mobile terminal, namely, the status information of the mobile terminal, is related to whether or not the mobile terminal meets the update condition. For example, the status information of the mobile terminal may be information regarding a status of the mobile terminal, such as 'updating an application on when a communication mode of the mobile terminal is a Wi-Fi mode', or the like.

Figure 6A:
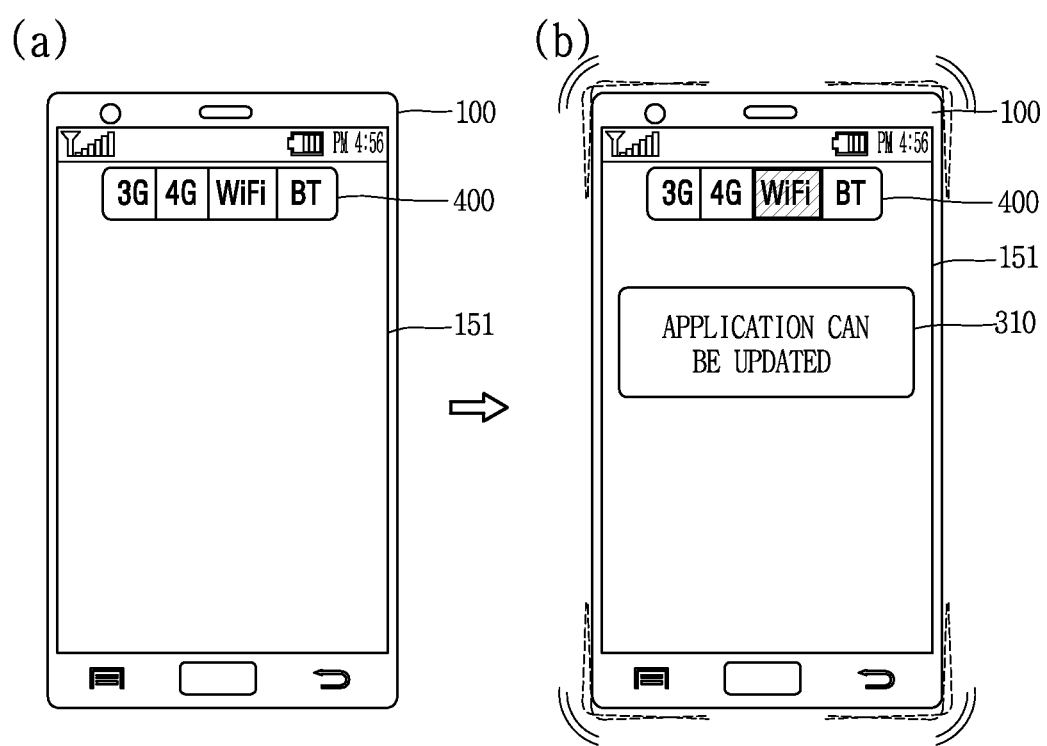
FIGS. 6A, 6B, 6C, 6D, and 6E are conceptual views explaining status information of the mobile terminal.

For example, as shown in FIG. 6A, the status information of the mobile terminal may be information related to a communication mode of the mobile terminal.

Here, the 'communication mode' may be a '3G mode', a '4G mode', a Wi-Fi mode', or the like, representing a wireless communication network to which the wireless communication unit 110 is currently connected. When the wireless communication unit 110 is connected to the 3G communication network, it may be expressed that the mobile terminal is set in the 3G communication mode.

For example, when the user sets the status information of the mobile terminal as 'performing updating on application when communication mode of terminal is connected to Wi-Fi mode', the checking unit 183 checks the communication mode of the wireless communication unit 110 in real time or at pre-set intervals.

According to the check results, as shown in FIG. 6A (b), when the communication mode is the Wi-Fi mode, the controller 180 may perform updating on the application detected by the detection unit 182.

Namely, the checking unit 183 checks the communication mode of the wireless communication unit 110, and when the communication mode of the wireless communication unit 110 is a communication mode that meets the update condition according to the check results, the controller 180 may control the detection unit 183 to detect an application in which the update event has occurred.

In addition, when the communication mode of the wireless communication unit 110 is changed, the controller 180 may compare a first communication rate corresponding to a previous communication mode before the change and the changed communication mode and a second communication rate corresponding to the changed communication mode. According to the comparison results, when the second communication mode corresponding to the changed communication mode is equal to or faster than the first communication mode before the change, the controller 180 may continue to perform updating on the application detected by the detection unit 182.

Meanwhile, when the second communication rate is slower than the first communication rate, or when the changed communication mode is a communication mode charged with a fare, the controller 180 may stop updating of the application.

Figure 6B:
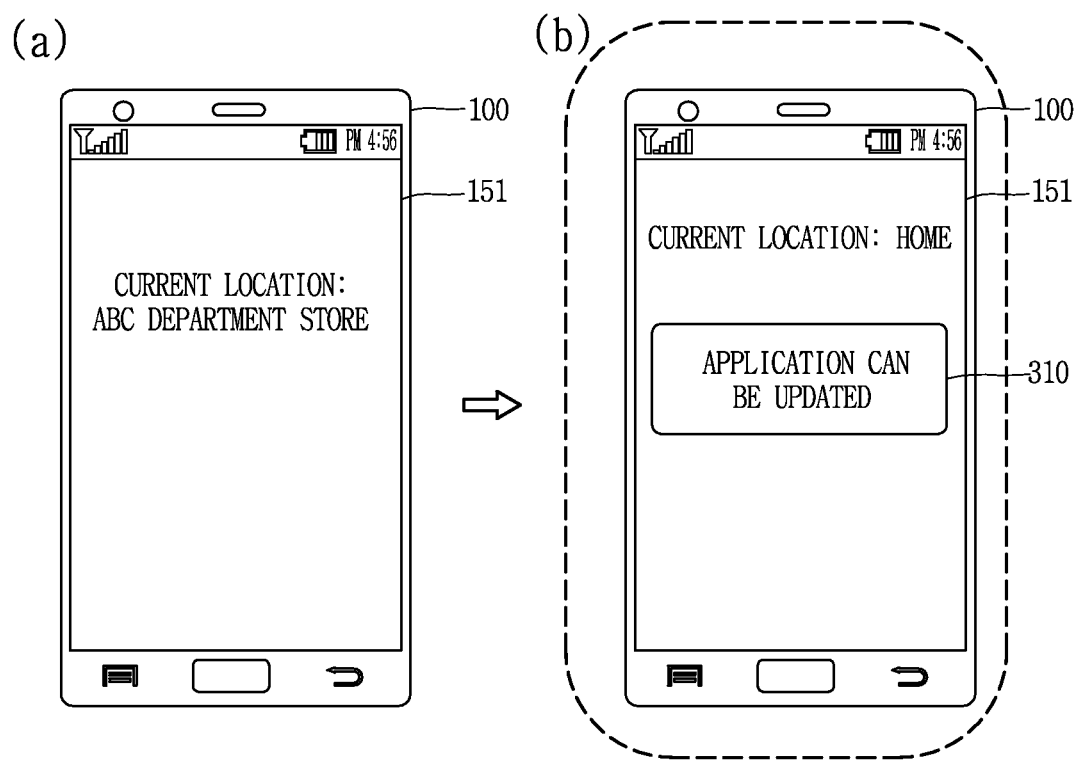

In another example, as shown in FIG. 6B, the status information of the mobile terminal may be information related to a location of the mobile terminal.

For example, as shown in FIG. 6B, when it is set such that updating is performed on an application when the mobile terminal is located in an area corresponding to the user's 'house, the checking unit 183 checks location information of the mobile terminal main body collected by the location information unit 115.

According to the check results, when the mobile terminal main body is located in a pre-set region, namely, in the 'house', the controller 180 executes updating on the application.

Figure 6C:
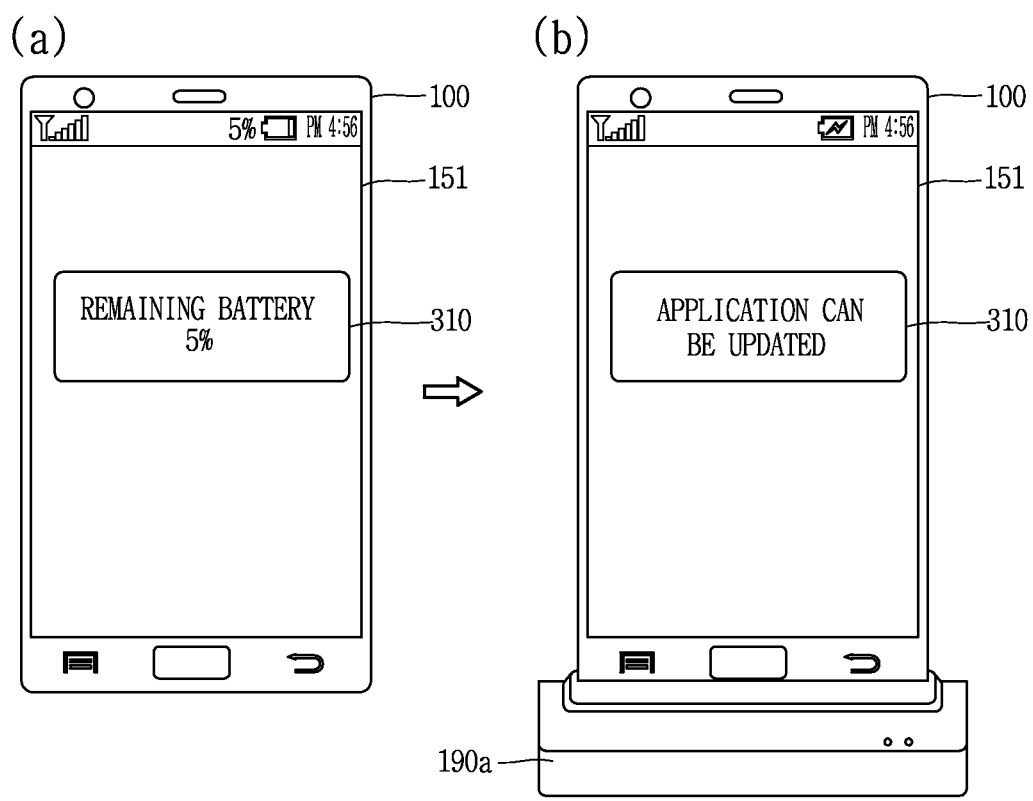

In another example, as shown in FIG. 6C, the status information of the mobile terminal may be related to a power state of the mobile terminal.

For example, the controller 180 may perform controlling such that updating is performed on an application when a power state, namely, a remaining battery capacity, of the mobile terminal is more than a pre-set level.

Also, as shown in FIG. 6C, the controller 180 may perform controlling such that updating is performed on an application when power is being supplied to the mobile terminal 100.

Namely, as illustrated, the checking unit 183 checks whether or not the mobile terminal is connected to a charger 190*a*, and on the basis of the check results, the controller 180 may control the detection unit 182 to detect an application in which the update event has occurred.

Figure 6D:
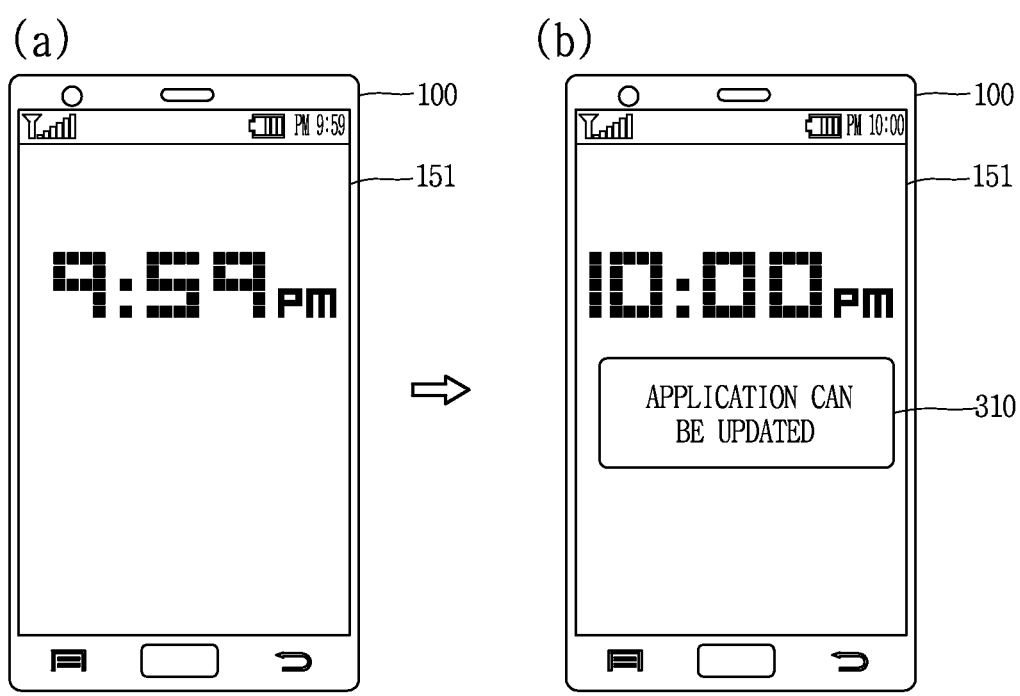

Also, in another example, as shown in FIG. 6D, the status information of the mobile terminal checked by the checking unit 183 may be information related to time.

For example, the user may set such that updating is executed on an application at a 'particular time', and the checking unit 183 may check whether or not the particular time set by the user arrives.

Figure 6E:
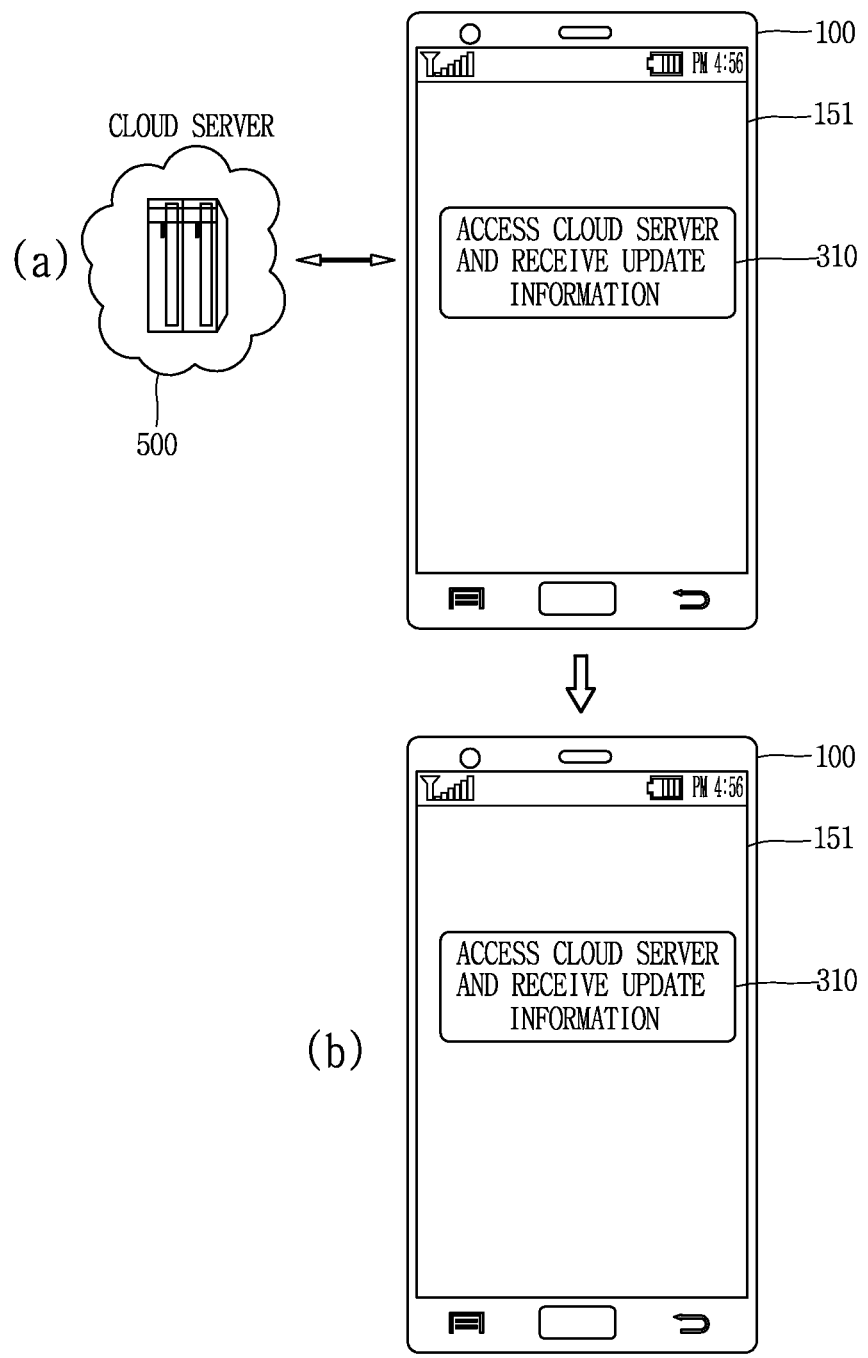

In another example, as shown in FIG. 6E (a), the status information of the mobile terminal may be related to whether or not the mobile terminal 100 is connected to an external cloud server 500.

Also, the checking unit 183 may check update information of a different wireless terminal which may be able to share information through the connected cloud server 500 and check whether or not updating has been performed on an application installed in the different wireless terminal in the same manner.

According to the check results, when updating was performed on the same application in the different wireless terminal, the controller 180 may perform updating on the application installed in the mobile terminal 100.

Meanwhile, besides the examples as described above, the status information of the mobile terminal performing updating on an application may be variably set.

Meanwhile, as shown in FIG. 7, the mobile terminal according to an embodiment of the present invention may visually provide status information of the mobile terminal and information regarding an application to the user through the display unit 151. FIG. 7 is a conceptual view explaining a method of providing information regarding an application in relation to updating in the mobile terminal according to an embodiment disclosed in the present disclosure.

For example, a case in which status information of the mobile terminal is set such that updating of the mobile terminal is performed when the mobile terminal enters a first region will be described.

As shown in FIG. 7(a), when the checking unit 183 checks that the mobile terminal 100 has entered the first region, the controller 180 informs that the mobile terminal has entered the first region through a pop-up window 310.

As shown in FIG. 7(b), the controller 180 outputs information regarding applications detected by the detection unit 182 by using icons or thumbnails 311, 312, and 313 to the display unit 151.

Here, when the user selects at least one of the detected applications, the controller 180 may perform updating on the selected application.

Also, as shown in FIG. 7(c), the controller 180 may automatically perform updating on the detected applications.

In the above, the method of performing updating on the application on the basis of the status information of the mobile terminal has been described.

Hereinafter, a method of detecting status information of the mobile terminal on the basis of an update event generated with respect to an application, and performing updating on the application on the basis of the detection results will be described.

Figure 8:
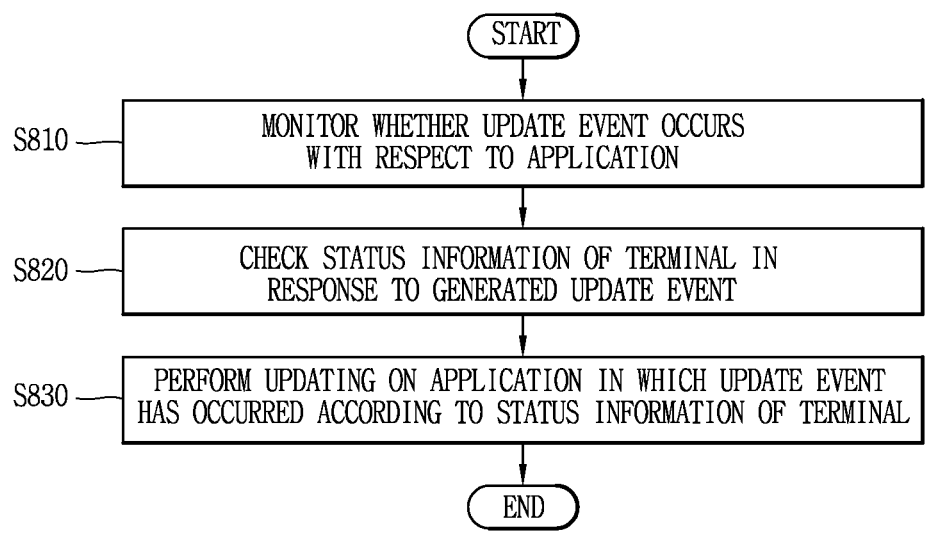
FIG. 8 is a flow chart illustrating a control method of the mobile terminal according to another embodiment disclosed in the present disclosure.

FIG. 8 is a flow chart illustrating a control method of the mobile terminal according to another embodiment disclosed in the present disclosure, and FIG. 9 is a conceptual view explaining an update method of the mobile terminal according to another embodiment disclosed in the present disclosure.

First, the monitoring unit 184 in FIG. 3 monitors whether or not the update event has occurred with respect to an application (step S810).

Here, the monitoring unit 184 may monitor the update event in real time or at intervals set by the user or the controller 180.

The monitoring unit 184 may monitor the update event with respect to every application installed in the mobile terminal, and in addition, the monitoring unit 184 may monitor the update event with respect to only an application selected by the user or the controller 180.

Meanwhile, according to the monitoring results obtained by the monitoring unit 184, when the monitoring event has occurred with respect to an application, the checking unit 183 checks status information of the mobile terminal in response to the occurrence of the update event (step S820).

For example, as shown in FIG. 9(a), when the update event has occurred in at least one application, the checking unit 183 checks status information of the mobile terminal as shown in FIG. 9(b).

For example, when the 'status information of terminal' is related to whether or not power is supplied to the power supply unit 190, namely, whether or not the charger 190a is connected to charge the battery, the checking unit 183 checks a power supply state of the mobile terminal.

According to the check results, when the status information of the mobile terminal meets an update condition, the controller 180 performs updating on the application in which the update event has occurred (step S830) as shown in FIG. 9(c).

Meanwhile, updating of an application may be automatically performed according to a selection of the controller 180, or may be performed according to a user selection.

FIGS. 10A and 10B are conceptual views explaining a method of performing updating based on status information in the mobile terminal according to another embodiment disclosed in the present disclosure.

For example, a case in which status information of the mobile terminal allowing for execution of updating on an application is information related to a communication mode and a remaining battery capacity (or a battery level) will be described.

When a case in which a communication mode among the status information of the mobile terminal is the Wi-Fi mode and a remaining battery capacity is 50% or greater is set to be a status of the mobile terminal satisfying the update condition, if the update event occurs in three applications as shown in FIG. 10A (a), the checking unit 184 checks the status information of the mobile terminal as shown in FIG. 10A (b).

According to the check results, when the communication mode is the Wi-Fi mode and the remaining battery capacity is 53%, namely, when the status information of the mobile terminal meets the update condition, the controller 180 performs updating on the applications in which the update event has occurred as shown in FIG. 10A (c).

Meanwhile, if the remaining battery capacity information of the status information of the mobile terminal is 10% as shown in FIG. 10B (b), namely, when the update condition is not met, although an application in which the update event has occurred is detected, the controller 180 does not perform updating on the application as shown in FIG. 10B (c).

Namely, in the mobile terminal according to an embodiment of the present invention, only when the mobile terminal is in a state in which updating can be performed on an application, updating can be performed.

Also, as described above, in the mobile terminal according to an embodiment of the present invention, updating may be performed on a particular application among applications in which the update event has occurred.

Figure 11:
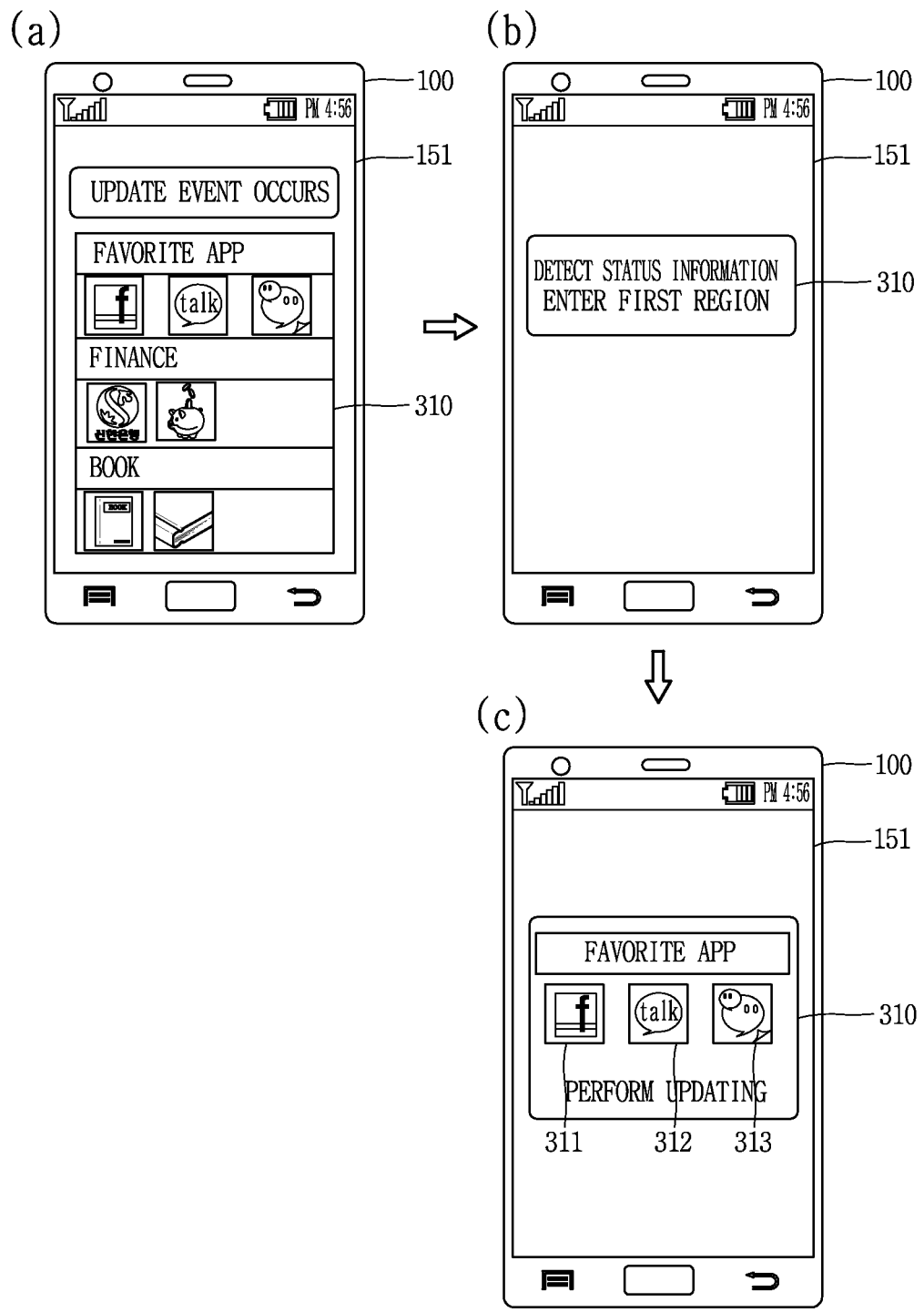
FIG. 11 is a conceptual view explaining a method of performing updating only on a particular application in the mobile terminal according to another embodiment disclosed in the present disclosure.

FIG. 11 is a conceptual view explaining a method of performing updating only on a particular application in the mobile terminal according to another embodiment disclosed in the present disclosure.

For example, when the update event occurs with respect to a plurality of applications as shown in FIG. 11(a) and status information of the mobile terminal meets the update condition as shown in FIG. 11(b), the controller 180 may perform updating only on a particular application.

For example, on the basis of a user selection, the controller 180 may control the mobile terminal to perform updating only on an application having high frequency of use (or a favorite application) among applications in which the update event has occurred.

Besides, the controller 180 may perform updating on an application selected by the user among icons of the update event generated applications as shown in FIG. 11(a).

Figure 12A:
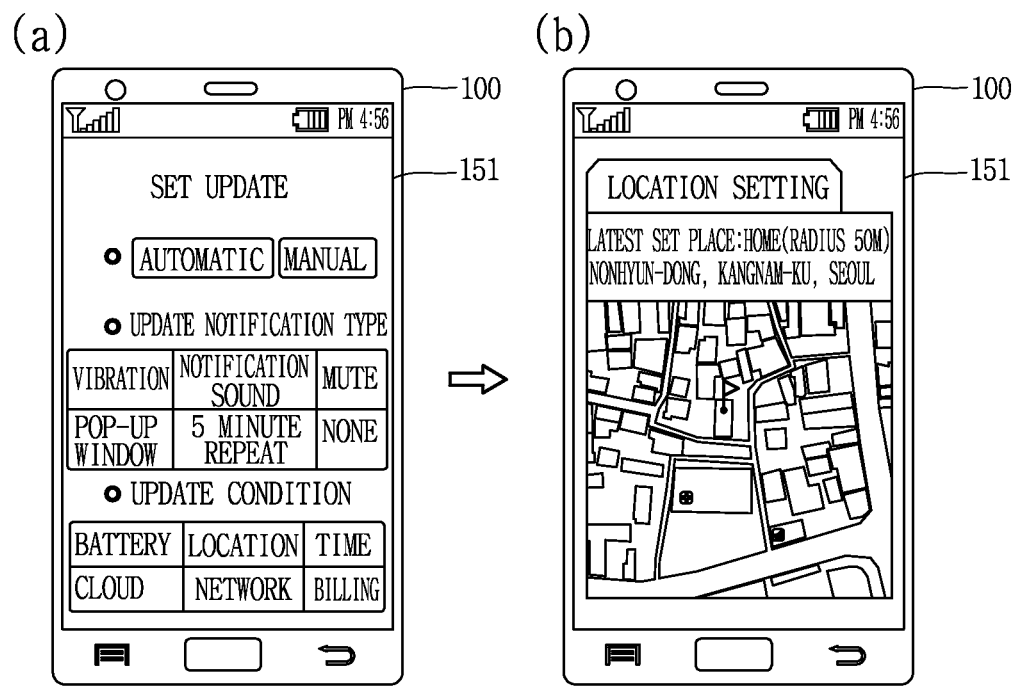
FIGS. 12A and 12B are conceptual views explaining a method of setting an update condition in mobile terminal disclosed in the present disclosure.
Figure 12B:
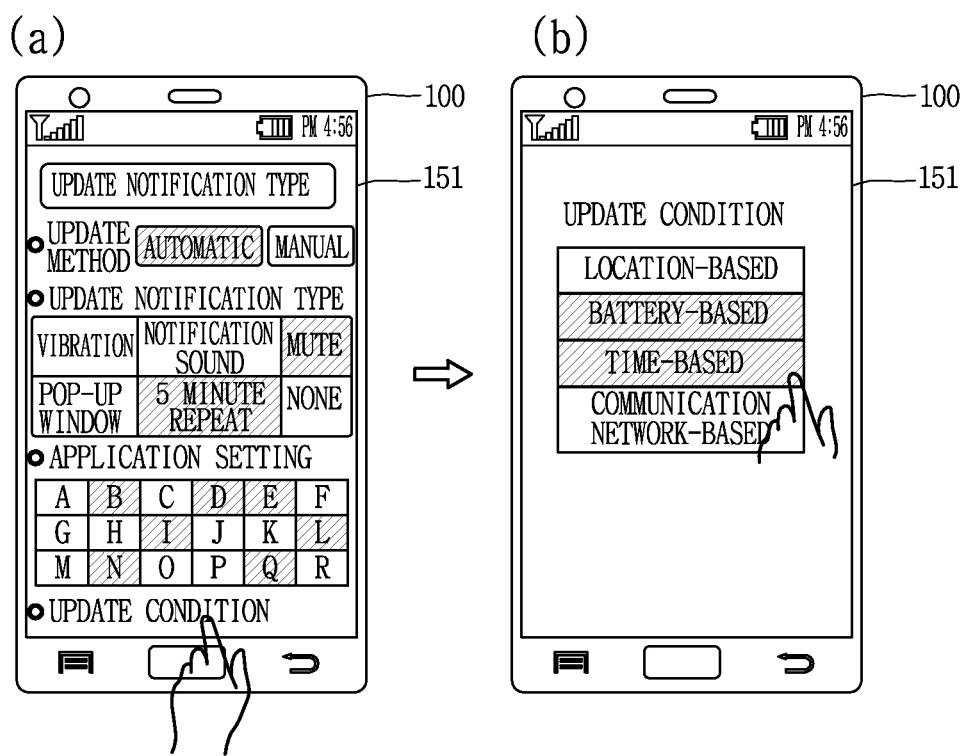

Hereinafter, status information of the mobile terminal for updating an application and an embodiment of selecting an application will be described. FIGS. 12A and 12B are conceptual views explaining a method of setting an update condition in mobile terminal disclosed in the present disclosure.

First, as shown in FIG. 12A (a), the user may set a condition related to updating of an application through a setting window.

For example, when status information of the mobile terminal meets the update condition, the user may select whether to automatically or manually perform updating.

And, the user may select a notification type for indicating the mobile terminal is in a state in which updating can be performed on an application, through the setting window. The user may select an update condition through the setting window or may select status information (a battery, a location, a time, a communication network, billing, cloud, and the like) of the mobile terminal related to the update condition.

For example, when the user selects status information of the mobile terminal in relation to 'location', the user may set a location corresponding to the update condition through a detailed map as shown in FIG. 12A (b).

Although not shown, the user may set various conditions in relation to updating such as a time interval at which the status information of the mobile terminal is checked, and the like, through the setting window.

Also, as shown in FIG. 12B, the user may select types of applications and update conditions.

For example, the user may select an application to be monitored by the monitoring unit 184 in FIG. 3.

As described above, in the mobile terminal and a control method thereof according to an embodiment of the present invention, by checking status information of the mobile terminal in relation to updating, when the mobile terminal is in a state in which updating can be performed, update information with respect to an application is output to the user, whereby the user can receive the update information.

Also, in the mobile terminal and a control method thereof according to an embodiment of the present invention, when the mobile terminal is in a state in which updating can be performed, updating may be automatically performed on an application, whereby user inconvenience of separately managing updating with respect to an application can be reduced.

In the above, the method of updating an application according to the status information of the mobile terminal has been described.

Hereinafter, a method of outputting information regarding an application that can be updated to the display unit will be described.

In the mobile terminal according to an embodiment disclosed in the present disclosure, when an update event with respect to an application occurs, information related to updating may be displayed on the display unit to allow the user to easily recognize information regarding the update event.

Hereinafter, a method of displaying information related to updating on the display unit in response to an update event generated with respect to an application will be described in detail.

Figure 13:
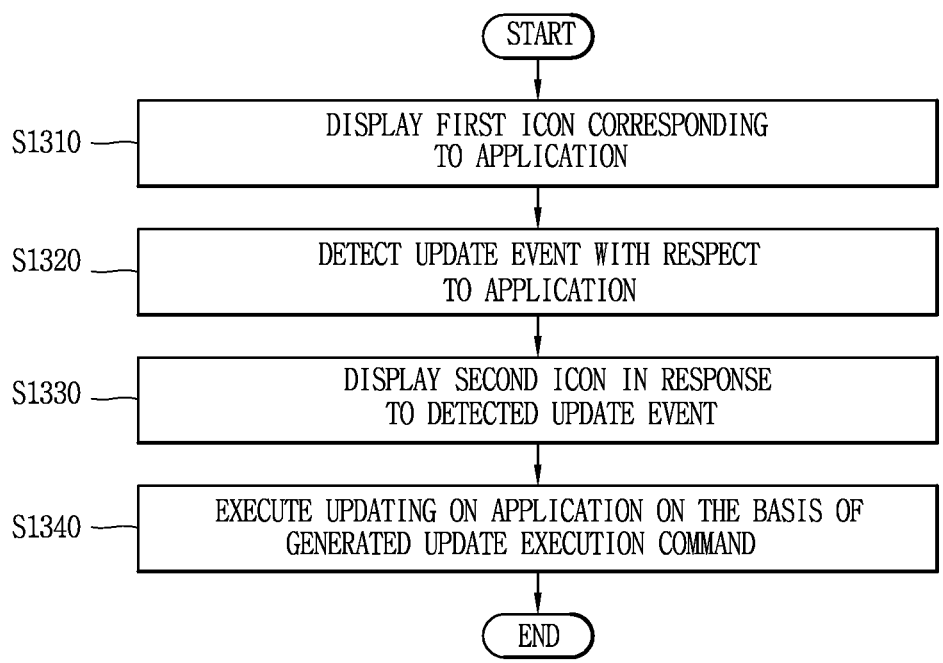
FIG. 13 is a flow chart illustrating a control method of displaying update information in the mobile terminal according to an embodiment disclosed in the present disclosure.
Figure 14:
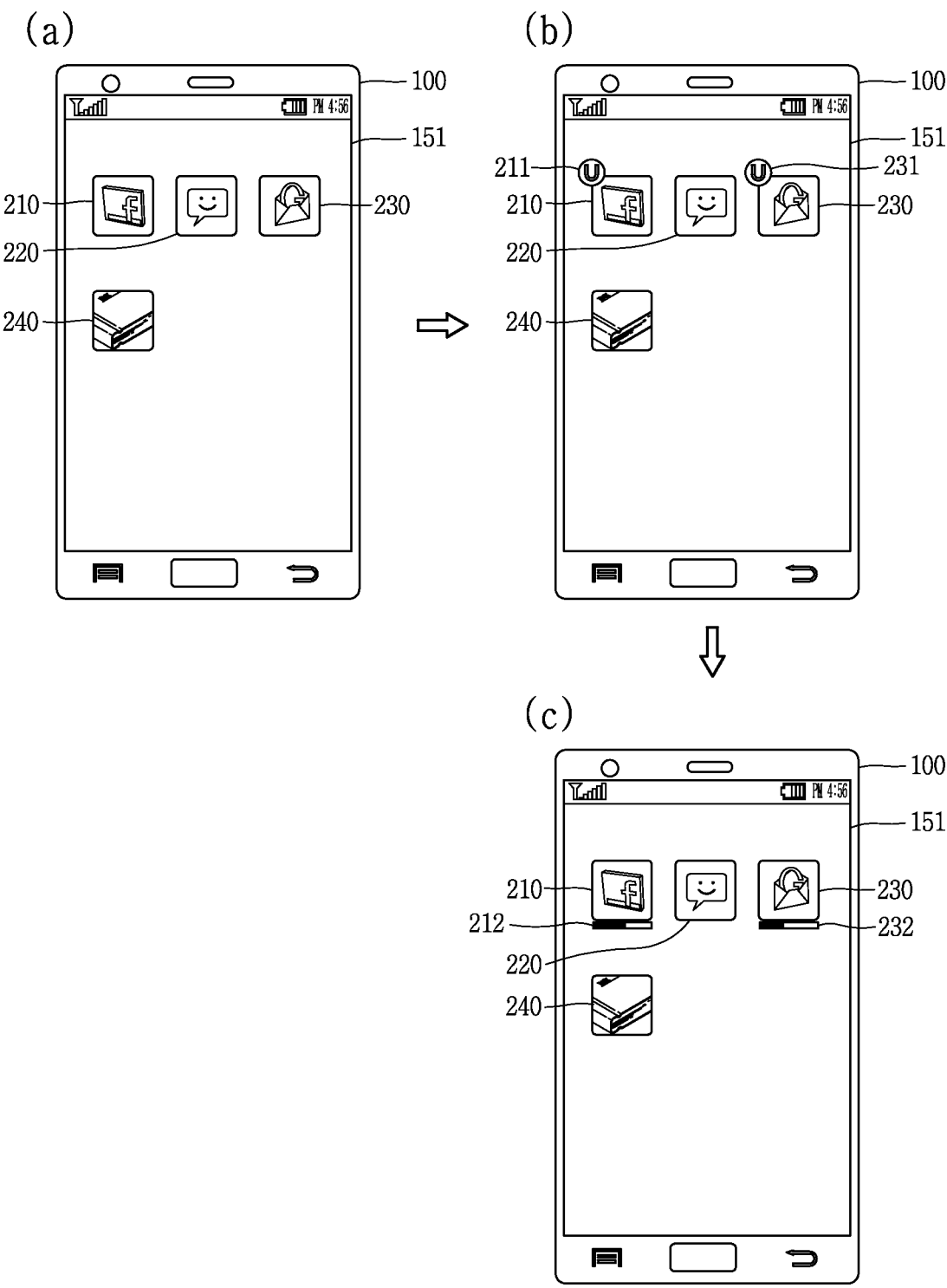
FIG. 14 is a conceptual view explaining a control method of displaying update information in the mobile terminal according to an embodiment disclosed in the present disclosure.

FIG. 13 is a flow chart illustrating a control method of displaying update information in the mobile terminal according to an embodiment disclosed in the present disclosure, and FIG. 14 is a conceptual view explaining the control method of displaying update information in the mobile terminal according to an embodiment disclosed in the present disclosure.

First, an application icon (referred to as a 'first icon', hereinafter) corresponding to an application is displayed on the display unit 151 (step S1310).

For example, first icons 210, 220, 230, and 240 representing respective applications are displayed on the display unit 151 as shown in FIG. 14(a).

The detection unit 182 detects an update event with respect to the applications (step S1320). Meanwhile, as shown in FIG. 14, besides the applications corresponding to the first icons 210, 220, 230, and 240 displayed on the display unit 151, the detection unit 182 may detect an update event with respect to all of the applications installed in the mobile terminal.

As described above, when the update event is detected by the detection unit 182, the controller 180 may display a second icon in a region adjacent to the application icons corresponding to the update event in response to the detected update event (step S1330).

For example, as shown in FIG. 14(b), the controller 180 displays update icons (or second icons 211 and 231) in regions adjacent to the first and third icons 210 and 230 in which the update event has occurred among the icons 210, 220, 230, and 240 displayed on the display unit 151. Accordingly, the user can recognize that the update event has occurred with respect to the corresponding applications through the update icons displayed in the regions adjacent to the application icons.

As described above, on the basis of an update execution command generated with respect to the applications in which the update event has occurred, the controller 180 executes updating on the corresponding applications (step S1340).

For example, the update execution command is generated, the controller 180 executes updating on the applications in which the update event has occurred as shown in FIG. 14(c). And, the controller 180 may provide information regarding a progress state of the updating through progress bars 212 and 232.

Hereinafter a method of generating the update execution command with respect to an application will be described in detail.

Figure 15:
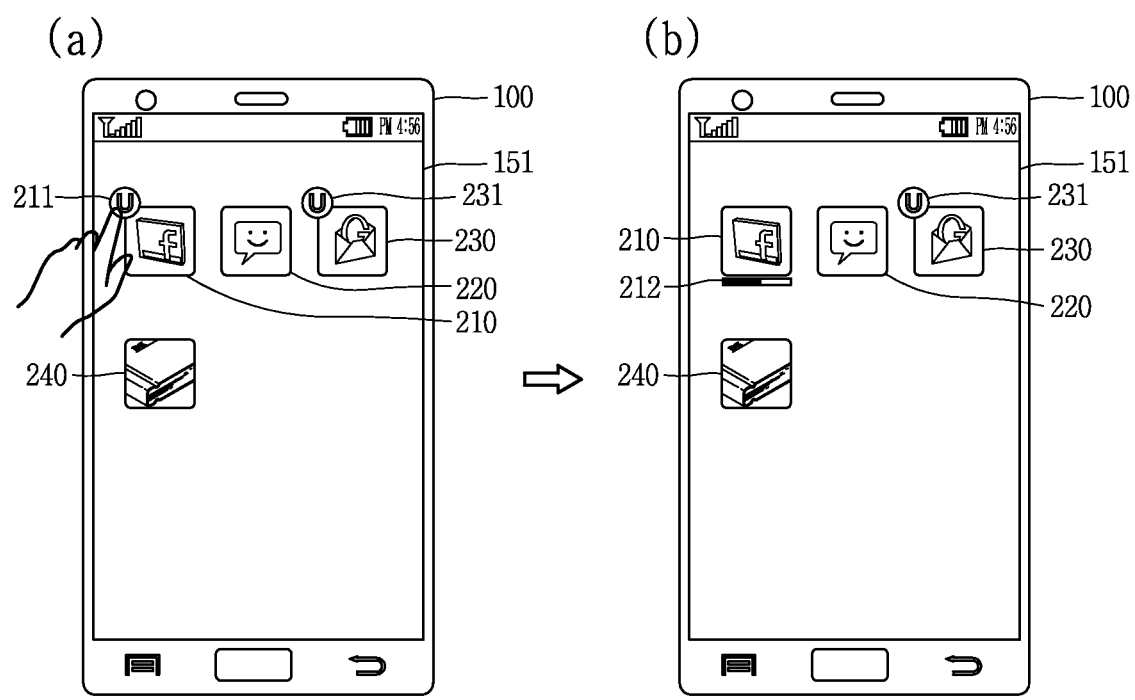
FIGS. 15, 16A and 16B are conceptual views explaining a method of generating an update execution command in the mobile terminal according to another embodiment disclosed in the present disclosure.
Figure 16A:
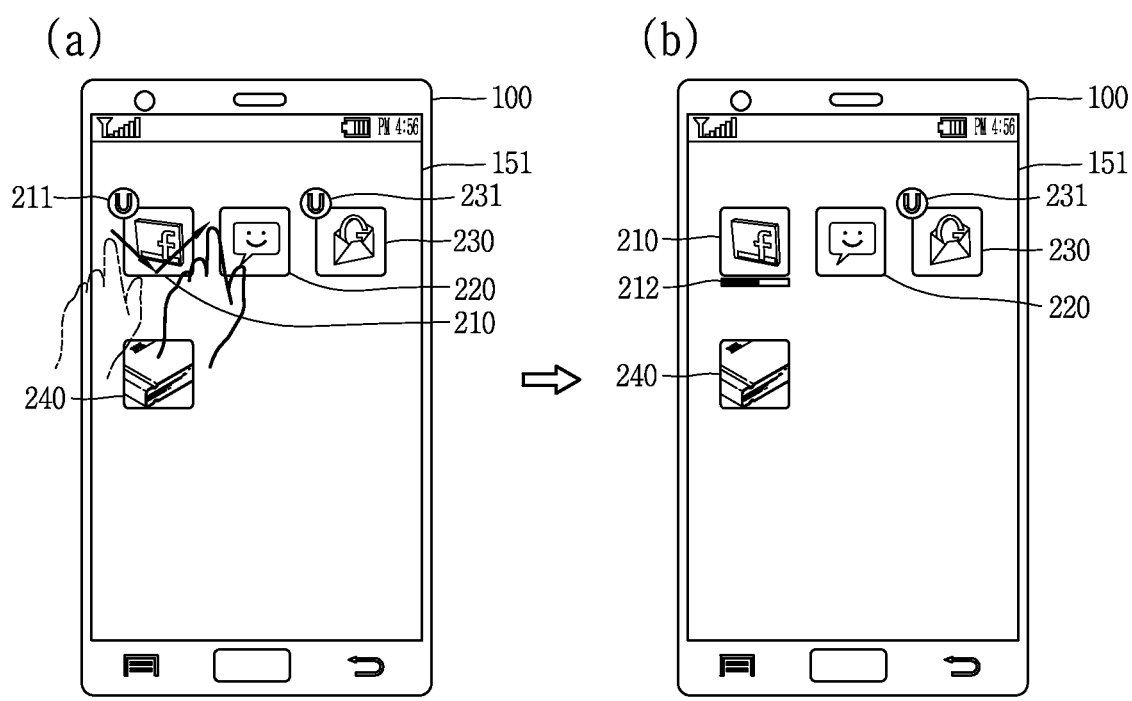
Figure 16B:
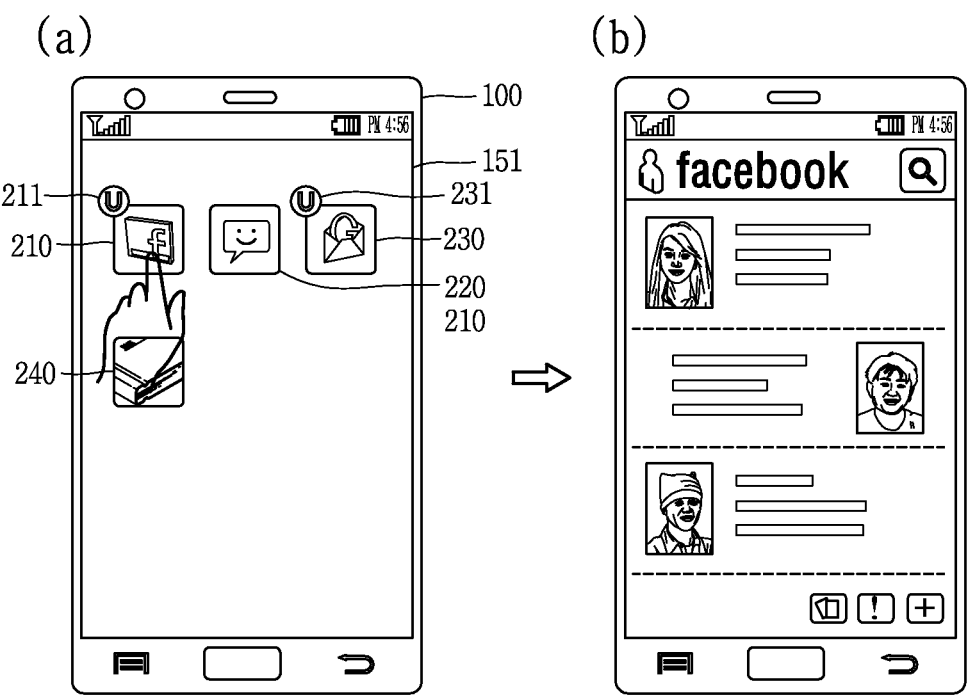

FIGS. 15, 16A and 16B are conceptual views explaining a method of generating an update execution command in the mobile terminal according to another embodiment disclosed in the present disclosure.

First, as shown in FIG. 15, the update execution command with respect to an application may be generated on the basis of a user selection with respect to the update icons 211 and 231 generated in the regions adjacent to the application icons 210 and 230.

When any one of the update icons is selected by the user, updating is performed on the application corresponding to the selected update icon as shown in FIG. 15(b).

The progress bar 212 indicating a progress state of the updating on the application may be displayed on the display unit 151 in response to the executed updating of the application.

Namely, the controller 180 may generate the update execution command in response to a touch input of the user applied to the update icon (or the second icon 211), and perform updating on the corresponding application in response to the update execution command.

Also, the update execution command may be generated on the basis of a pre-set touch pattern applied to an application icon.

For example, as shown in FIG. 16A (a), when an touch of a pre-set pattern is applied to the application icon 211 in which the update event has occurred, the controller 180 may update the corresponding application.

Here, the pre-set touch pattern may be a touch input having a certain path or may be a touch input having a certain type such as double touches, a long touch, and the like.

Namely, in the mobile terminal according to an embodiment of the present invention, a touch input executing a function with respect to an application and a touch input executing updating with respect to an application may be discriminated by using the different types of touch inputs with respect to the application icon 211.

Thus, when a touch of a particular pattern is input with respect to the application icon 211 as shown in FIG. 16A (a), updating is performed on the application corresponding to the application icon 210 as shown in FIG. 16A (b).

And, when a general single touch is input with respect to the application icon 211 as shown in FIG. 16B (a), the application icon 210 is activated and an application execution screen corresponding to the application icon 210 is output to the display unit 151 as shown in FIG. 16B (b).

Meanwhile, although not shown, the update execution command may be generated on the basis of status information of the mobile terminal. For example, when an update event with respect to an application is detected, the controller 180 controls the checking unit 182 in FIG. 3 to check status information of the mobile terminal in relation to updating of an application.

And, according to the check results of the checking unit 183, when the status information of the mobile terminal meets the update condition, the update execution command with respect to the application is generated, and the controller 180 performs updating on the corresponding application in response to the update execution command. Meanwhile, a detailed description in relation to the status information of the mobile terminal and the checking unit 183 has been described, so it is omitted here.

As described above, in the mobile terminal according to an embodiment of the present invention, since the update icons are displayed such that they correspond to the applications in which the update event has occurred and updating is immediately performed on corresponding icons through the update icons, the user can simply control updating of applications.

Hereinafter, a method of displaying update information on a currently output page when there are a plurality of pages in which icons of applications are displayed and an update event occurs in an application corresponding to an application icon included in at least one of the plurality of pages will be described.

Here, a page is a basic screen displayed in an idle state (or a standby state) of the mobile terminal, and in general, it is expressed as a home screen.

Also, when application icons corresponding to applications can be output to the page, at least one application icon may be displayed on a single page and application icons corresponding to different applications may be displayed on each page.

Also, a plurality of pages may exist according to a setting by the user or the controller 180.

Hereinafter, a method of displaying update event information in relation to an application on a page (or a home screen) will be described in detail.

Figure 17:
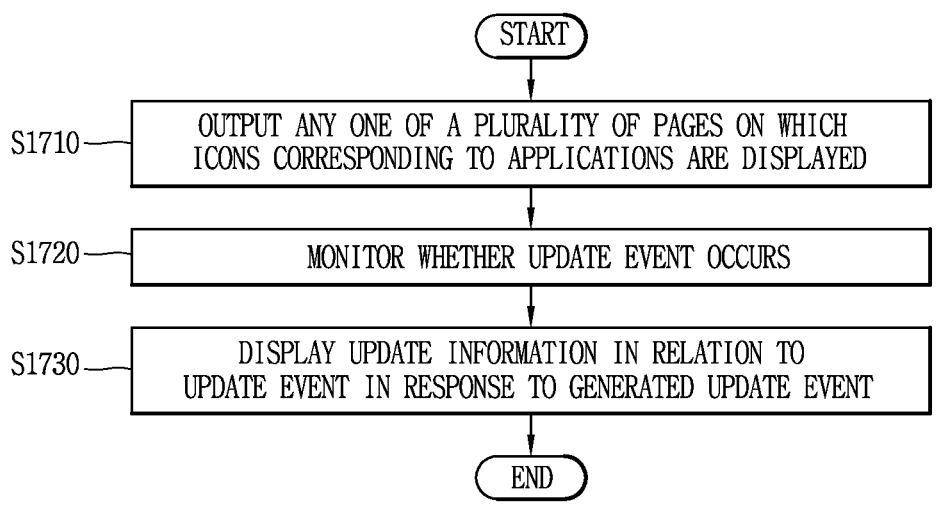
FIG. 17 is a flow chart illustrating a control method of displaying update information in the mobile terminal according to another embodiment disclosed in the present disclosure.
Figure 18:
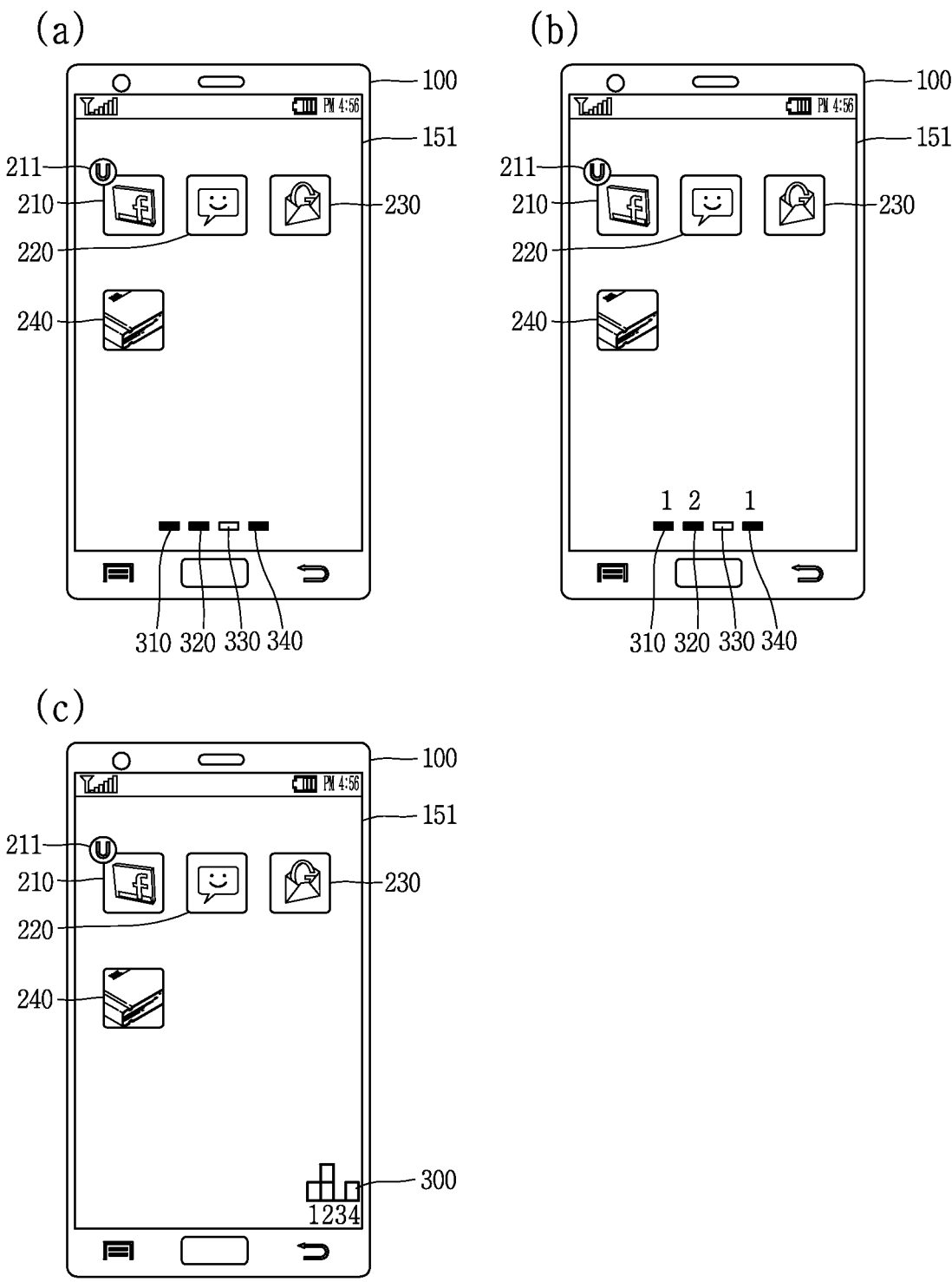
FIG. 18 is a conceptual view explaining the control method of displaying update information in the mobile terminal according to another embodiment disclosed in the present disclosure.
Figure 19:
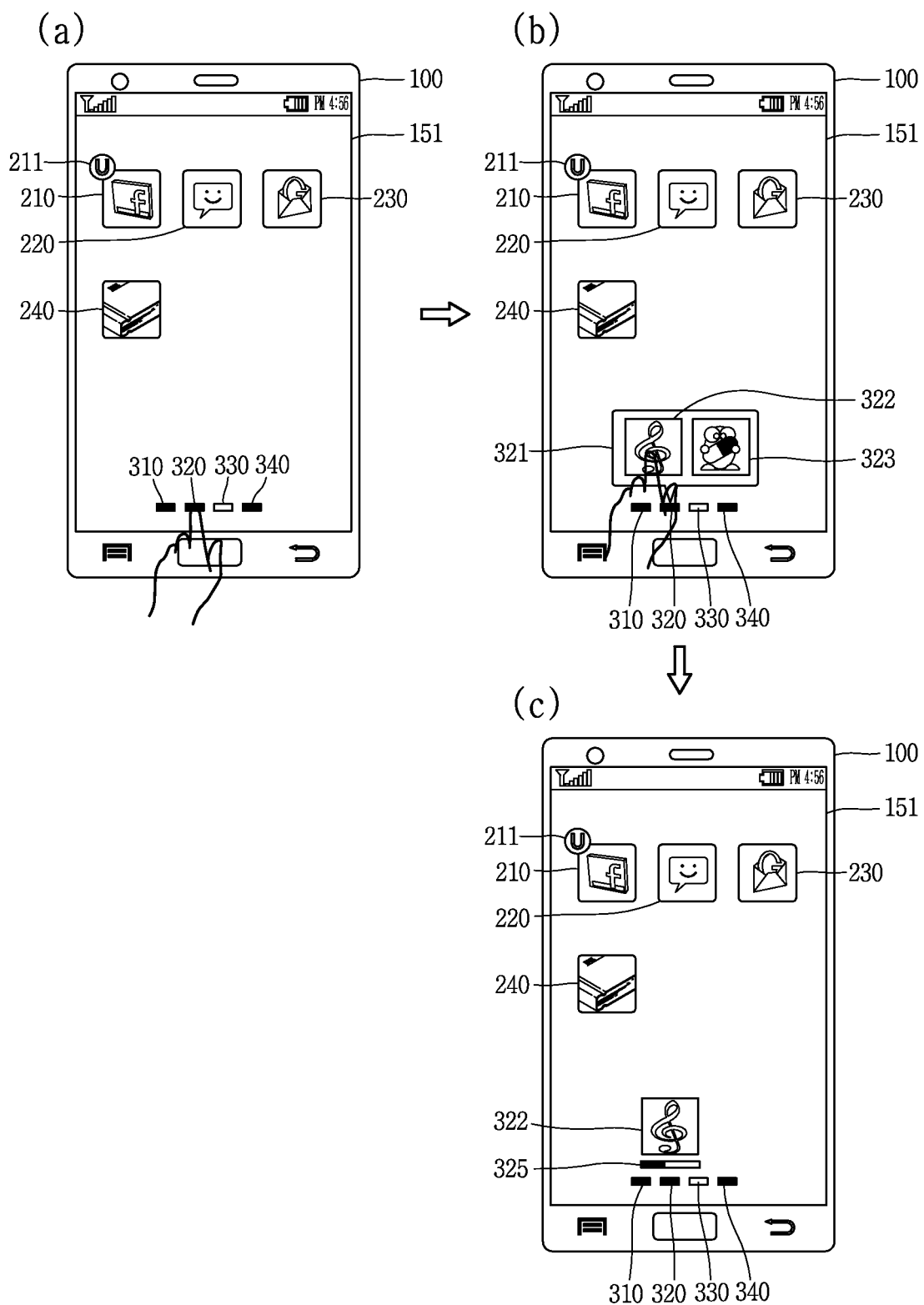

FIG. 17 is a flow chart illustrating a control method of displaying update information in the mobile terminal according to another embodiment disclosed in the present disclosure, and FIG. 18 is a conceptual view explaining the control method of displaying update information in the mobile terminal according to another embodiment disclosed in the present disclosure.

First, the controller 180 outputs any one of a plurality of pages displaying icons corresponding to applications thereon to the display unit 151 (step S1710).

For example, as shown in FIG. 18(a), any one of the pages is displayed on the display unit 151. And, page images 310, 320, 330, and 340 indicating the presence of a plurality of pages is displayed on the page. For example, as illustrated, the mobile terminal according to an embodiment of the present invention currently includes four home screen pages.

The monitoring unit 184 monitors whether or not an update event occurs in at least one of applications corresponding to the icons, respectively, displayed on the plurality of pages (step S1720).

Here, the monitoring unit 184 may monitor the update event in real time or at every pre-set time intervals.

Meanwhile, when the update event has occurred according to the monitoring results of the monitoring unit 184, the controller 180 displays update information in relation to the update event on the page output to the display unit 151 (step S1730).

As shown in FIG. 18(a), the update information may be displayed in a region adjacent to a page image corresponding to the page including the application icon in which the update event has occurred among the plurality of page images 310, 320, 330, and 340.

For example, when the update event has occurred in the applications corresponding to the application icons included in the first, second, and fourth pages, only the first, second, and fourth page images 310, 320, and 330 may be displayed to have a different color as shown in FIG. 18(a).

Also, as shown in FIG. 18(b), the number, i.e., number information, of the applications in which the update event has occurred among the applications corresponding to the application icons included in the corresponding pages may be displayed in regions adjacent to the page images 310, 320, and 340.

Also, as shown in FIG. 18(c), the controller 180 may display the number information 300 of the applications in which the update event has occurred in an intuitive manner, apart from the page image.

As described above, in the mobile terminal according to an embodiment of the present invention, although application icons are distributedly displayed in a plurality of pages, update information in relation to applications included in different pages is provided on a single page output to the display unit, whereby the user can recognize update information in relation to applications at a glance.

Hereinafter, a method of executing updating on an application by using update information displayed on a page image as described above will be described.

FIGS. 19, 20, 21, 22A and 22B are conceptual views explaining a method of displaying update information in the mobile terminal according to another embodiment disclosed in the present disclosure.

For example, when any one of page images corresponding to pages including application icons corresponding to applications in which an update event has occurred among page images is selected as shown in FIG. 19(a), the controller 180 may display thumbnails 322 and 323 of the icons corresponding to the update event among the application icons included in the corresponding page as shown in FIG. 19(b).

Also, when any one of the plurality of page images is selected, the controller 180 may display update detailed information of an application in relation to the selected page.

Here, the update detailed information may be various types of information such as a type of an application, an update capacity, version information, an update provider, and the like.

Meanwhile, as shown in FIG. 19(b), the controller 180 may generate a pop-up window 321 to display the icons or thumbnails of the applications in which the update event has occurred in the pop-up window 321.

As shown in FIG. 19(b), when any one of the thumbnails displayed on the display unit 151 is selected by the user, the controller 180 may execute updating on an application corresponding to the thumbnail 321 selected by the user as shown in FIG. 19(c).

Meanwhile, although not shown, when any one of the plurality of images is selected in FIG. 19(a), the controller 180 may perform updating on the applications in which the update event has occurred among the applications corresponding to the application icons displayed on the selected page image on the whole.

In this case, the controller 180 may display a progress bar indicating a progress state of the updating on the page currently output to the display unit 151.

Also, the controller 180 may change an output range of the display unit 151 such that a page corresponding to the page image selected by the user is output, and the user may check an application in which the update event has occurred from the changed page.

Also, when any one of the plurality of page images 310, 320, and 340 is selected as shown in FIG. 20(a), the controller 180 may display a pop-up window 400 displaying update target applications of a corresponding page as shown in FIG. 20(b).

An application update list may be displayed in the pop-up window 400. The user may select any one of the plurality of update target applications through the pop-up window 400, so that updating can be performed on the selected application. Also, the user may perform updating on the update target applications included in the corresponding page on the whole through an 'entire approval' icon 410.

Meanwhile, as shown in FIG. 19(c) and (d), the controller 180 may display progress bars 321 and 322 indicating a progress state of the updating on the applications on the basis of a user selection.

Also, although a particular page is not selected by the user, when status information of the mobile terminal in relation to updating of an application meets an update condition, the controller 180 may update an application corresponding to an update event monitored by the monitoring unit 184.

The controller 180 may display information regarding updated application as shown in FIG. 20(c) and (d).

Also, when the status information of the mobile terminal meets the update condition, or when an application that can be updated is detected by the monitoring unit 184, the controller 180 may display a list of applications that can be updated.

The controller 180 may display the list of applications that can be updated through a pop-up window.

For example, as shown in FIG. 21, the controller may display the list of applications in which the update event has occurred, among applications corresponding to application icons displayed on a plurality of pages, in separate display regions (e.g., pop-up windows).

The controller 180 may categorize the list of applications that can be updated according to various references such as the latest usage date, the frequency of use, types of applications, an update capacity, an optimized communication mode, a user classification, and the like.

For example, as shown in FIG. 21(a), the controller 180 may align to display applications in which the update event has occurred, on the basis of the applications which have been lately used.

As shown in FIG. 21(b), the controller 180 may align the applications in which the update event has occurred, on the basis of an update size. As shown in FIG. 21(c), the controller 180 may align the applications in which the update event has occurred according to the types of the applications.

On the basis of a user selection, the controller 180 may perform updating only on at least one of the applications on the list or perform updating on all of the applications on the list.

Also, although not shown, the user may set order of the updated applications through an update list window illustrated in FIG. 21.

Also, when an application in which the update event has occurred is detected by the monitoring unit 184, the controller 180 may generate a separate page on which an icon corresponding to the application in which the update event has occurred.

Figure 22A:
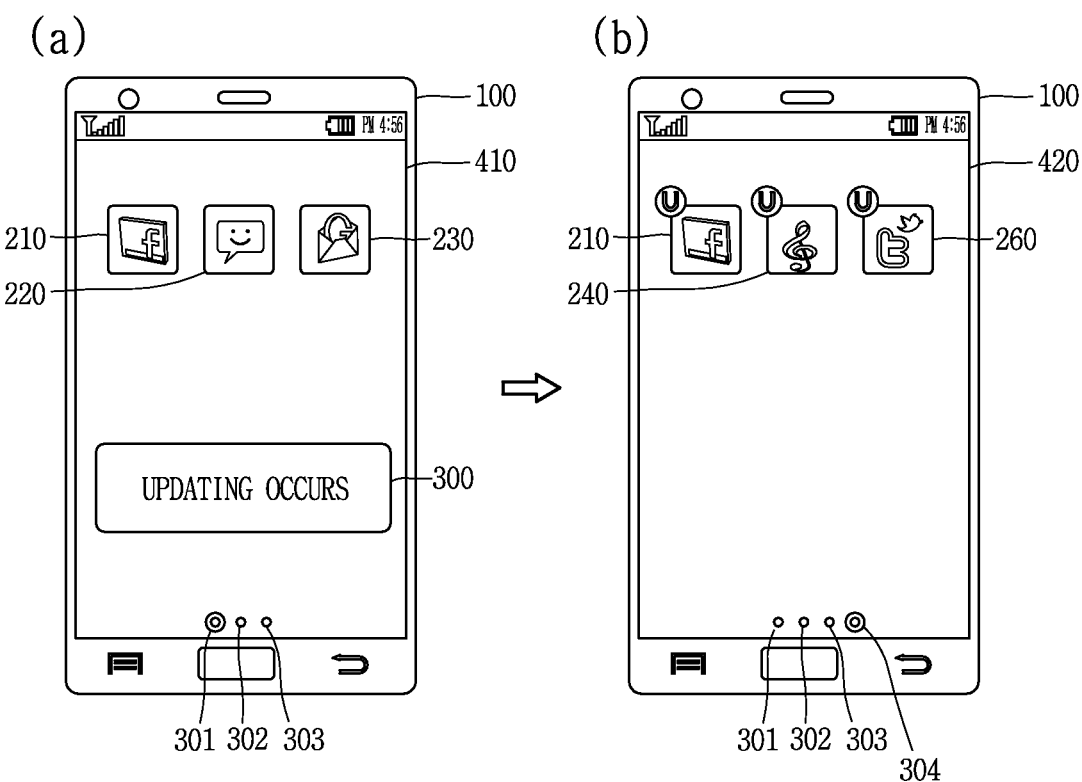

For example, as shown in FIG. 22A (a), at first, the mobile terminal includes three pages (or home screens 301, 302, and 303), and when the update event occurs in at least one application, the controller 180 generates a new page 420 as shown in FIG. 22A(b). The controller 180 may display a page image 304 as identification information regarding the new page on the display unit 151.

The controller 180 displays the icons 210, 240, and 260 in which the update event has occurred on the newly generated page 420, whereby the user can view information regarding the applications in which the update event has occurred at a glance.

Also, when any one of the icons 210, 240, and 260 is selected by the user from the newly generated page 420, the controller 180 may execute updating on the selected application.

Figure 22B:
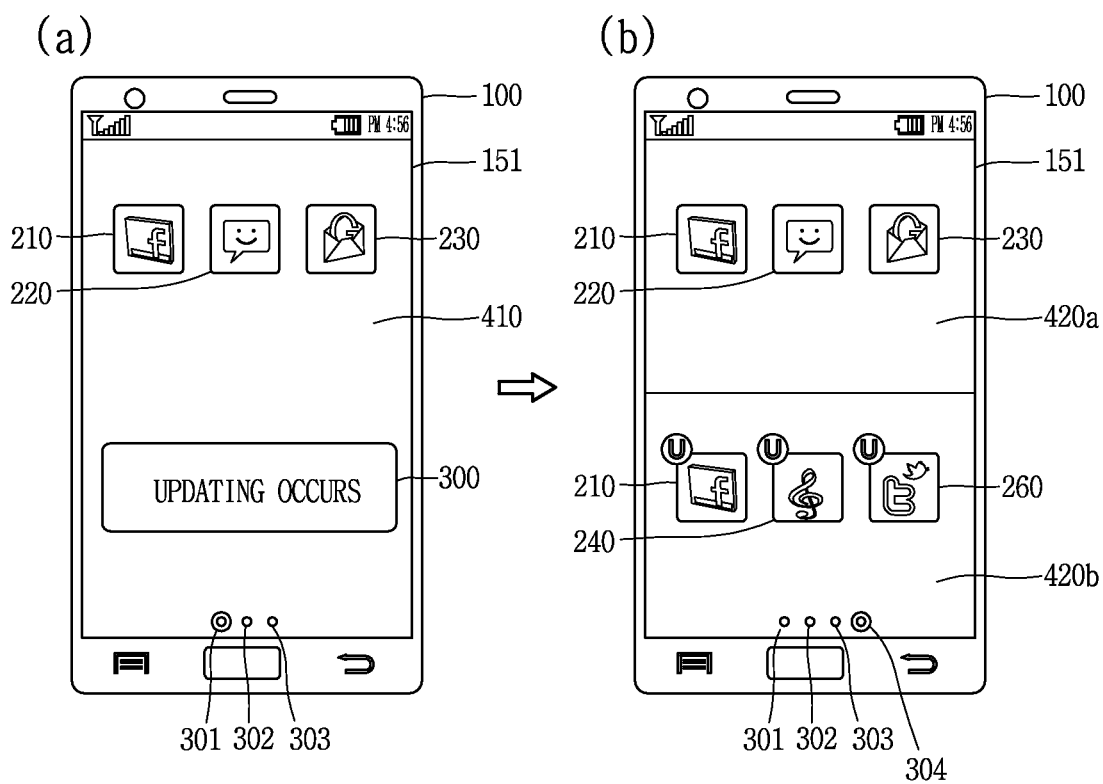

Besides, when an update event occurs according to monitoring of the monitoring unit 184 as shown in FIG. 22B (a), the controller 180 may divide the page currently output to the display unit into a first region 420a and a second region 420b.

The controller 180 may display the icons 210, 240, and 260 of the applications in which the update event has occurred in any one divided region 420b.

Also, when any one of the icons 210, 240, and 260 displayed in the divided region 420b is selected by the user, the controller 180 may execute updating on the selected application.

As described above, in the mobile terminal according to an embodiment of the present invention, since an application icon corresponding to an application in which an update event has occurred is displayed on a separate page or in a separate region, intuitive information can be provided to the user.

Also, in the mobile terminal and the control method thereof according to an embodiment of the present invention, status information of the mobile terminal in relation to updating is checked, and when the mobile terminal is in a state in which updating can be performed, update information regarding an application is output to the user, whereby the user can be provided with update information.

In addition, in the mobile terminal and the control method thereof according to an embodiment of the present invention, when the mobile terminal is in a state in which updating can be performed, updating is automatically performed on an application, whereby user inconvenience of separately managing updating with respect to the application can be reduced.

In addition, in the mobile terminal and the control method thereof according to an embodiment of the present invention, update information of an application not displayed on the display unit is output, whereby the user can recognize update with respect to an application installed in the mobile terminal by tuition.

As the exemplary embodiments may be implemented in several forms without departing from the characteristics thereof, it should also be understood that the above-described embodiments are not limited by any of the details of the foregoing description, unless otherwise specified, but rather should be construed broadly within its scope as defined in the appended claims. Therefore, various changes and modifications that fall within the scope of the claims, or equivalents of such scope are therefore intended to be embraced by the appended claims.

What is claimed is:

1. A mobile terminal comprising:
a checking unit configured to check status information of the mobile terminal in relation to updating of an application;
a sensing unit configured to sense an application in which an update event has occurred; and
a controller configured to perform updating on the application sensed by the sensing unit,
wherein the status information of the mobile terminal is associated with communication mode information, and
wherein the updating of the application sensed by the sensing unit is performed when a communication mode of a wireless communication unit meets an update condition according to the checking results.

2. The mobile terminal of claim 1, wherein when the status information of the mobile terminal corresponds with a pre-set update condition, the detection unit detects the application in which an update event has occurred.

3. The mobile terminal of claim 2, wherein when the application in which the update event has occurred is detected by the detection unit, the controller outputs update information with respect to the detected application.

4. The mobile terminal of claim 3, wherein the update information is output through a pop-up window displayed on a display unit, and the controller automatically performs updating on the detected application or performs updating on the basis of an update command applied through the pop-up window.

5. The mobile terminal of claim 1, wherein the status information of the mobile terminal is associated with at least one of time information, location information, battery information, capacity information of battery, information regarding the frequency of use of an application, and communication mode information.

6. The mobile terminal of claim 5, further comprising:
a mobile terminal main body; and
a location information unit configured to collect location information of the main body,
wherein the checking unit checks whether or not the location information of the main body collected by the location information unit indicates that main body has entered a pre-set region.

7. The mobile terminal of claim 1, wherein when the communication mode is changed, the controller compares a first communication rate corresponding to a previous communication mode before the change and a communication rate corresponding to the changed communication mode, and determines whether to perform updating on the detected application on the basis of the comparison results.

8. A mobile terminal, comprising:
a touch screen configured to display a list of a plurality of update conditions with regard to a plurality of applications stored at the mobile terminal, wherein at least one of the plurality of update conditions is related to a communication mode; and
a controller configured to:
update at least one of the plurality of applications based on that the communication mode of the mobile terminal corresponds to a previously selected update condition related to the communication mode; and
cause the touch screen to display at least one icon representing the at least one of the plurality of applications.

9. The mobile terminal of claim 8, wherein a plurality of progress bars is displayed with the icons.

10. The mobile terminal of claim 8, wherein the controller does not perform updating on the plurality of applications when a remaining battery capacity is under a reference value.

11. The mobile terminal of claim 8, wherein the controller is configured to:
set another update conditions related to whether at least one of the plurality of applications is to be updated in response to a user's input and
update only remaining applications different from the at least one application among the plurality of application, and not update the at least one application based on the set the another update condition, based on that the communication mode of the mobile terminal corresponds to the communication mode of the previously selected update condition of the list.

12. The mobile terminal of claim 8, wherein the controller is configured to provide notification according to a selected notification type, and
wherein the provided notification indicates that the plurality of applications needs updating, and wherein the selected notification type is one of plurality of different notification types.

13. The mobile terminal of claim 8, wherein a notification type among a plurality of notification types is selected in response to a user input; and
wherein the controller is configured to provide notification according to the selected notification type to indicate that the plurality of applications needs updating.

14. The mobile terminal of claim 8, wherein the controller is further configured to:
identify that the communication mode of the mobile terminal corresponds to the communication mode of the previously selected update condition;
identify that the plurality of applications meets the update condition after the identifying that the communication mode of the mobile terminal corresponds to the communication mode of the previously selected update condition; and
perform the updating the plurality of application after the identifying that the plurality of application meets the update condition.

15. The mobile terminal of claim 8, wherein the controller is configured to control the touch screen to display, prior to the update, an indicator that indicates that the plurality of applications needs updating.

16. The mobile terminal of claim 8, wherein an indicator that indicates that the plurality of applications needs updating is displayed, and
wherein the displaying of the indicator occurs in response to the communication mode of the mobile terminal corresponding to the communication mode of the previously selected update condition of the list.

17. A method performed in a mobile terminal, the method comprising:
displaying, on a touch screen, a list of a plurality of update conditions with regard to a plurality of applications stored at the mobile terminal, wherein at least one of the plurality of update conditions is related to a communication mode;
updating at least one of the plurality of applications based on that the communication mode of the mobile terminal corresponds to a previously selected update condition related to the communication mode; and displaying, on the touch screen, at least one icon representing the at least one of the plurality of applications.

18. The method of claim 17, wherein a plurality of progress bars is displayed with the icons.

19. The method of claim 17, wherein if a remaining battery capacity is under a reference value, updating on the plurality of applications doesn't be performed.

20. The method of claim 17, further comprising:
setting another update conditions related to whether at least one of the plurality of applications is to be updated in response to a user's input and
updating only remaining applications different from the at least one application among the plurality of application , and not updating the at least one application based on the set the another update condition, based on that the communication mode of the mobile terminal corresponds to the communication mode of the previously selected update condition of the list.

21. The method of claim 17, further comprising providing notification according to a selected notification type, and
wherein the provided notification indicates that the plurality of applications needs updating, and wherein the selected notification type is one of plurality of different notification types.

22. The method of claim 17, wherein a notification type among a plurality of notification types is selected in response to a user input; and
wherein the controller is configured to provide notification according to the selected notification type to indicate that the plurality of applications needs updating.

23. The method of claim 17, further comprising:
identifying that the communication mode of the mobile terminal corresponds to the communication mode of the previously selected update condition;
identifying that the plurality of applications meets the update condition after the identifying that the communication mode of the mobile terminal corresponds to the communication mode of the previously selected update condition; and
performing the updating the plurality of application after the identifying that the plurality of application meets the update condition.

24. The method of claim 17, wherein prior to the update, an indicator that indicates that the plurality of applications needs updating is displayed on the touch screen.

25. The method of claim 17, wherein an indicator that indicates that the plurality of applications needs updating is displayed on the touch screen, and
wherein the displaying of the indicator occurs in response to the communication mode of the mobile terminal corresponding to the communication mode of the previously selected update condition of the list.

* * * * *